(12) United States Patent
Yoshioka et al.

(10) Patent No.: US 12,471,804 B2
(45) Date of Patent: Nov. 18, 2025

(54) ENDOSCOPE APPARATUS, METHOD OF OPERATING THE SAME, AND NON-TRANSITORY COMPUTER READABLE MEDIUM

(71) Applicant: FUJIFILM Corporation, Tokyo (JP)

(72) Inventors: Masato Yoshioka, Kanagawa (JP); Masaaki Oosake, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 573 days.

(21) Appl. No.: 17/808,727

(22) Filed: Jun. 24, 2022

(65) Prior Publication Data

US 2022/0330850 A1 Oct. 20, 2022

Related U.S. Application Data

(63) Continuation of application No. PCT/JP2020/038509, filed on Oct. 12, 2020.

(30) Foreign Application Priority Data

Dec. 25, 2019 (JP) .................................. 2019-234984

(51) Int. Cl.
*A61B 1/06* (2006.01)
*A61B 1/00* (2006.01)
(Continued)

(52) U.S. Cl.
CPC ........ *A61B 5/1076* (2013.01); *A61B 1/00045* (2013.01); *A61B 1/06* (2013.01);
(Continued)

(58) Field of Classification Search
None
See application file for complete search history.

(56) References Cited

U.S. PATENT DOCUMENTS

| 2009/0043161 A1* | 2/2009 | Doi | A61B 1/00006 |
| | | | 600/117 |
| 2009/0097725 A1* | 4/2009 | Krupnik | A61B 1/041 |
| | | | 382/128 |

(Continued)

FOREIGN PATENT DOCUMENTS

| DE | 36 29 435 A1 | 3/1987 |
| EP | 3 513 703 A1 | 7/2019 |

(Continued)

OTHER PUBLICATIONS

Li, Y., Hara, S., Ito, W., & Shimura, K. (2007). A machine learning approach for interactive lesion segmentation. Proceedings of SPIE, 6512(1), 651246-651248. https://doi.org/10.1117/12.708910 (Year: 2007).*

(Continued)

*Primary Examiner* — Amandeep Saini
*Assistant Examiner* — Caroline Tabancay Duffy
(74) *Attorney, Agent, or Firm* — Studebaker Brackett PLLC

(57) ABSTRACT

In an endoscope apparatus including a processor, the processor specifies the position of a specific region and sets a reference scale in a picked-up image that is obtained from the image pickup of a subject on which the specific region formed by auxiliary measurement light is formed. Then, the processor extracts a region of interest, determines a measurement portion, calculates a measured value obtained from the measurement of the measurement portion, on the basis of the reference scale, and generates a measured value marker using the measured value. Further, the processor creates a specific image in which the measured value marker is superimposed on the picked-up image.

18 Claims, 20 Drawing Sheets

(51) Int. Cl.
  *A61B 5/06*    (2006.01)
  *A61B 5/107*   (2006.01)
  *G06T 7/62*    (2017.01)

(52) U.S. Cl.
  CPC ............ *A61B 1/0605* (2022.02); *A61B 5/064* (2013.01); *G06T 7/62* (2017.01); *G06T 2207/10068* (2013.01)

(56) References Cited

U.S. PATENT DOCUMENTS

| | | | | |
|---|---|---|---|---|
| 2017/0150904 | A1* | 6/2017 | Park | G06T 7/60 |
| 2018/0342074 | A1* | 11/2018 | Sakamoto | G06T 5/70 |
| 2019/0204069 | A1 | 7/2019 | Tatsuta et al. | |
| 2020/0100651 | A1 | 4/2020 | Tatsuta et al. | |

FOREIGN PATENT DOCUMENTS

| | | | | |
|---|---|---|---|---|
| EP | 3 609 425 | A1 | 2/2020 | |
| JP | S62-73223 | A | 4/1987 | |
| JP | 2008-061659 | A | 3/2008 | |
| JP | 2017-520355 | A | 7/2017 | |
| JP | 2019-195643 | A | 11/2019 | |
| WO | 2018/051680 | A1 | 3/2018 | |
| WO | WO-2018051679 | A1 * | 3/2018 | ......... A61B 1/00045 |
| WO | 2018/189742 | A1 | 10/2018 | |
| WO | 2019/017019 | A1 | 1/2019 | |

OTHER PUBLICATIONS

Lakovidis, D. K., Dimas, G., Karargyris, A., Bianchi, F., Ciuti, G., & Koulaouzidis, A. (2019). Deep Endoscopic Visual Measurements. IEEE Journal of Biomedical and Health Informatics, 23(6), 2211-2219. https://doi.org/10.1109/JBHI.2018.2853987 (Year: 2019).*
Hiromasa Nakatani, Keiichi Abe, Atsuo Miyakawa, Susumu Terakawa M.D., "Three-dimensional measurement endoscope system with virtual rulers," J. Biomed. Opt. 12(5) 051803 (Sep. 1, 2007) (Year: 2007).*
An Office Action; "Notice of Reasons for Refusal," mailed by the Japanese Patent Office on May 23, 2023, which corresponds to Japanese Patent Application No. 2021-566837 and is related to U.S. Appl. No. 17/808,727; with English language translation.
The extended European search report issued by the European Patent Office on Jan. 5, 2023, which corresponds to European Patent Application No. 20904910.5-1210 and is related to U.S. Appl. No. 17/808,727.
International Search Report issued in PCT/JP2020/038509; mailed Nov. 17, 2020.
Written Opinion of the International Searching Authority issued in PCT/JP2020/038509; mailed Nov. 17, 2020.
Communication pursuant to Article 94(3) EPC issued by the European Patent Office on Jan. 27, 2025, which corresponds to European Patent Application No. 20 904 910.5-1207 and is related to U.S. Appl. No. 17/808,727.

* cited by examiner

ENDOSCOPE APPARATUS, METHOD OF OPERATING THE SAME, AND NON-TRANSITORY COMPUTER READABLE MEDIUM

CROSS-REFERENCE TO RELATED APPLICATIONS

This application is a Continuation of PCT International Application No. PCT/JP2020/038509 filed on 12 Oct. 2020, which claims priority under 35 U.S.C § 119(a) to Japanese Patent Application No. 2019-234984 filed on 25 Dec. 2019. The above application is hereby expressly incorporated by reference, in its entirety, into the present application.

BACKGROUND OF THE INVENTION

1. Field of the Invention

The present invention relates to an endoscope apparatus that measures the size of a subject, a method of operating the endoscope apparatus, and a non-transitory computer readable medium.

2. Description of the Related Art

In an endoscope apparatus, a distance to a subject is measured or the length or size of the subject is calculated. In, for example, WO2018/051680A (corresponding to US2019/204069A1), a subject is irradiated with auxiliary measurement light emitted from a laser and a spot is formed on the subject. The position of the spot is specified from a picked-up image that is obtained from the image pickup of the subject. Then, an index figure, which represents the actual size of an object to be measured included in the subject, is set according to the position of the spot, and a measured value marker consisting of the set index figure is displayed in the picked-up image.

The measured value marker includes, for example, a fixed-sized scale that is widened vertically and horizontally. Accordingly, in a case where a picked-up image in which the measured value marker is set on the object to be measured or near the object to be measured is displayed, the size of the object to be measured can be estimated and calculated using the comparison of the scale of the measured value marker and the object to be measured.

SUMMARY OF THE INVENTION

In the related art, the length of the object to be measured is measured using the comparison of the measured value marker including a preset fixed-sized scale and an object to be measured. However, in such a method, during the measurement of the object to be measured, time and effort may be required to maintain a state in which the measured value marker and the object to be measured are aligned with each other for the easy measurement of the object to be measured or to store a static image in which the measured value marker is aligned with the object to be measured.

The present invention has been made in consideration of the above-mentioned circumstances and an object of the present invention is to provide an endoscope apparatus that can allow an object to be measured to be simply measured, a method of operating the endoscope apparatus, and a non-transitory computer readable medium.

An endoscope apparatus according to an aspect of the present invention comprises an auxiliary measurement light source unit that emits auxiliary measurement light to be used for measurement of a subject, and a processor. The processor acquires a picked-up image obtained from image pickup of the subject that includes a specific region formed on the subject by the auxiliary measurement light; specifies a position of the specific region formed on the subject in the picked-up image; sets a reference scale, which indicates an actual size of the subject, on the basis of the position of the specific region; extracts a region of interest that is included in the subject in the picked-up image; determines a measurement portion, of which a size is to be measured, of the region of interest; generates a measured value marker, which indicates a measured value obtained from measurement of the measurement portion of the region of interest, on the basis of the reference scale; and creates a specific image in which the measured value marker is superimposed on the picked-up image.

It is preferable that the processor determines a size of the region of interest in a horizontal direction, which is obtained in a case where the picked-up image is displayed on a display, as the measurement portion.

It is preferable that, in a case where the specific region is present on the region of interest and the specific region is used as a base point, the processor determines a portion, of which a size from the base point is the maximum, of the region of interest as the measurement portion.

It is preferable that the processor determines a portion, which has a maximum size in an arbitrary direction, of the region of interest as the measurement portion.

It is preferable that the processor receives a designation of the measurement portion and determines the measurement portion according to the designation.

It is preferable that, in a case where an actual size of the reference scale is denoted by L0, the number of pixels of the reference scale in a case where the reference scale is superimposed on the picked-up image is denoted by Aa, the number of pixels of the measurement portion in a case where the reference scale is superimposed on the measurement portion of the region of interest in the picked-up image is denoted by Ba, and an actual size of the measured value marker is denoted by L1, the processor generates the measured value marker so that the following equation (1) is satisfied.

$$L1 = L0 \times Ba/Aa \quad (1)$$

It is preferable that, in a case where an actual size of the reference scale is denoted by L0, the number of pixels of the reference scale in a case where the reference scale is superimposed on the picked-up image and a correction is made in consideration of distortion information of the picked-up image is denoted by Ac, the number of pixels of the measurement portion in a case where the reference scale is superimposed on the measurement portion of the region of interest in the picked-up image and a correction is made in consideration of the distortion information of the picked-up image is denoted by Bc, and an actual size of the measured value marker is denoted by L1, the processor generates the measured value marker so that the following equation (2) is satisfied.

$$L1 = L0 \times Bc/Ac \quad (2)$$

It is preferable that the auxiliary measurement light has a planar shape, a shape of a mesh, or a shape of a dot and the specific region has a linear shape, a shape of a mesh, or a shape of a dot.

It is preferable that the measured value marker has a shape of a straight line segment or a shape of a combination of straight line segments.

It is preferable that the measured value marker includes a numeral that represents the measured value.

It is preferable that the measured value marker is a numeral itself that represents the measured value.

It is preferable that the processor creates a specific image in which the measured value marker is superimposed on the picked-up image so as to be aligned with the measurement portion of the region of interest.

It is preferable that the processor creates a specific image in which the measured value marker is superimposed on the picked-up image at a portion other than the measurement portion of the region of interest.

It is preferable that the processor extracts the region of interest using a trained model trained using the picked-up image acquired in the past.

It is preferable that the processor determines the measurement portion using a trained model trained using the picked-up image acquired in the past.

It is preferable that the processor stores teacher data in which the specific image and the measured value are associated with each other.

Further, according to another aspect of the present invention, there is provided a method of operating an endoscope apparatus comprising: an auxiliary measurement light emission step of emitting auxiliary measurement light to be used for measurement of a subject; a picked-up image acquisition step of acquiring a picked-up image obtained from image pickup of the subject that includes a specific region formed on the subject by the auxiliary measurement light; a position specifying step of specifying a position of the specific region formed on the subject in the picked-up image; a reference scale setting step of setting a reference scale, which indicates an actual size of the subject, on the basis of the position of the specific region; a region-of-interest extraction step of extracting a region of interest that is included in the subject in the picked-up image; a measurement portion determination step of determining a measurement portion, of which a size is to be measured, of the region of interest; a measured value marker generation step of generating a measured value marker, which indicates a measured value obtained from measurement of the measurement portion of the region of interest, on the basis of the reference scale; and a specific image generation step of creating a specific image in which the measured value marker is superimposed on the picked-up image.

Furthermore, according to still another aspect of the present invention, there is provided a non-transitory computer readable medium for storing a computer-executable program for an endoscope apparatus including an auxiliary measurement light source unit that emits auxiliary measurement light to be used for measurement of a subject. The computer-executable program causes a computer to implement: a function of emitting auxiliary measurement light to be used for measurement of a subject; a function of acquiring a picked-up image obtained from image pickup of the subject that includes a specific region formed on the subject by the auxiliary measurement light; a function of specifying a position of the specific region formed on the subject in the picked-up image; a function of setting a reference scale, which indicates an actual size of the subject, on the basis of the position of the specific region; a function of extracting a region of interest that is included in the subject in the picked-up image; a function of determining a measurement portion, of which a size is to be measured, of the region of interest; a function of generating a measured value marker, which indicates a measured value obtained from measurement of the measurement portion of the region of interest, on the basis of the reference scale; and a function of creating a specific image in which the measured value marker is superimposed on the picked-up image.

According to the present invention, it is possible to simply measure an object to be measured.

DESCRIPTION OF THE PREFERRED EMBODIMENTS

Figure 1:
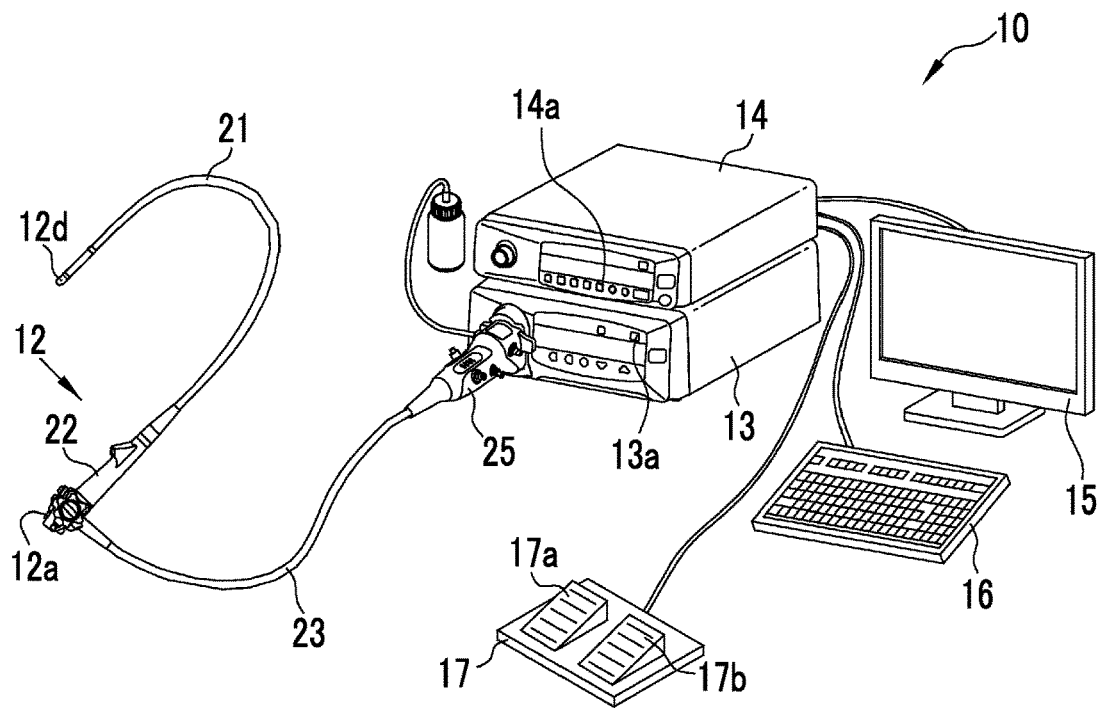
FIG. 1 is a diagram showing the appearance of an endoscope apparatus.

As shown in FIG. 1, an endoscope apparatus 10 includes an endoscope 12, a light source device 13, a processor device 14, a monitor 15, and a keyboard 16 and a foot switch 17 that are a user interface. The endoscope 12 is optically connected to the light source device 13, and is electrically connected to the processor device 14. The processor device 14 is electrically connected to the monitor 15 (display unit) that displays an image. The keyboard 16 and the foot switch 17, which are a user interface, are connected to the processor device 14, and are used for various setting operations and the like for the processor device 14. The user interface includes a mouse and the like in addition to the keyboard 16 or the foot switch 17 shown in FIG. 1. The foot switch 17 comprises a left switch 17a and a right switch 17b.

The processor device 14 includes processor buttons 14a that are used to give preset various instructions. The processor buttons 14a may be installed at a part of an operation panel, such as a touch panel, connected to the processor device 14. Further, the light source device 13 includes a light source button 13a that is used to give preset various instructions.

The endoscope 12 includes an insertion part 21 that is to be inserted into an object to be examined, an operation part 22 that is provided at the proximal end portion of the insertion part 21, and a universal cable 23. The operation part 22 includes a scope button 12a that is used to give preset various instructions while a user of the endoscope 12 is operating the endoscope 12. The universal cable 23 is a cable in which a light guide part (not shown) for guiding illumination light emitted from the light source device 13, a control line for transmitting control signals used to control the endoscope 12, a signal line for transmitting image signals obtained from the image pickup of an object to be observed, a power line for supplying power to each part of the endoscope 12, and the like are integrated. The distal end of the universal cable 23 is provided with a connector 25 to be connected to the light source device 13. Further, the light guide part of the endoscope 12 is a light guide in which optical fibers are bundled.

The endoscope 12 has a normal mode and a length measurement mode, and these two modes are switched by an instruction. A mode switching instruction can be set in any one or more of the processor buttons 14a, the scope button 12a, the foot switch 17, or the like. These buttons function as a mode changeover switch by setting.

The normal mode is a mode in which a picked-up image obtained from the image pickup of an object to be observed illuminated with illumination light is displayed. Accordingly, a measured value marker is not displayed in the normal mode. The length measurement mode is a mode in which an object to be observed is illuminated with illumination light and auxiliary measurement light and a measured value marker used for the measurement of the size and the like of the object to be observed is displayed in a picked-up image obtained from the image pickup of the object to be observed. The auxiliary measurement light is light that is used for the measurement of the object to be observed.

The function of a static image-acquisition instruction switch, which gives an instruction to acquire the static image of a picked-up image, may be set in any one or more of the processor buttons 14a, the scope button 12a, the foot switch 17, or the like. In a case where a user gives an instruction to acquire a static image by the static image-acquisition instruction switch, the screen of the monitor 15 is frozen and an alert sound (for example, "beep") informing the user of the acquisition of a static image is generated together. Then, for example, the static images of the picked-up image, which are obtained before and after the operation timing of the scope button 12a, are stored in an image storage unit 55 (FIG. 3) provided in the processor device 14. Further, it is preferable that measurement information to be described later is also stored together with the static image of the picked-up image in a case where the endoscope 12 is set to the length measurement mode. The image storage unit 55 is a storage unit, such as a hard disk or a universal serial bus (USB) memory. In a case where the processor device 14 can be connected to a network, the static image of the picked-up image may be stored in an image storage server (not shown), which is connected to the network, instead of or in addition to the image storage unit 55.

Figure 2:
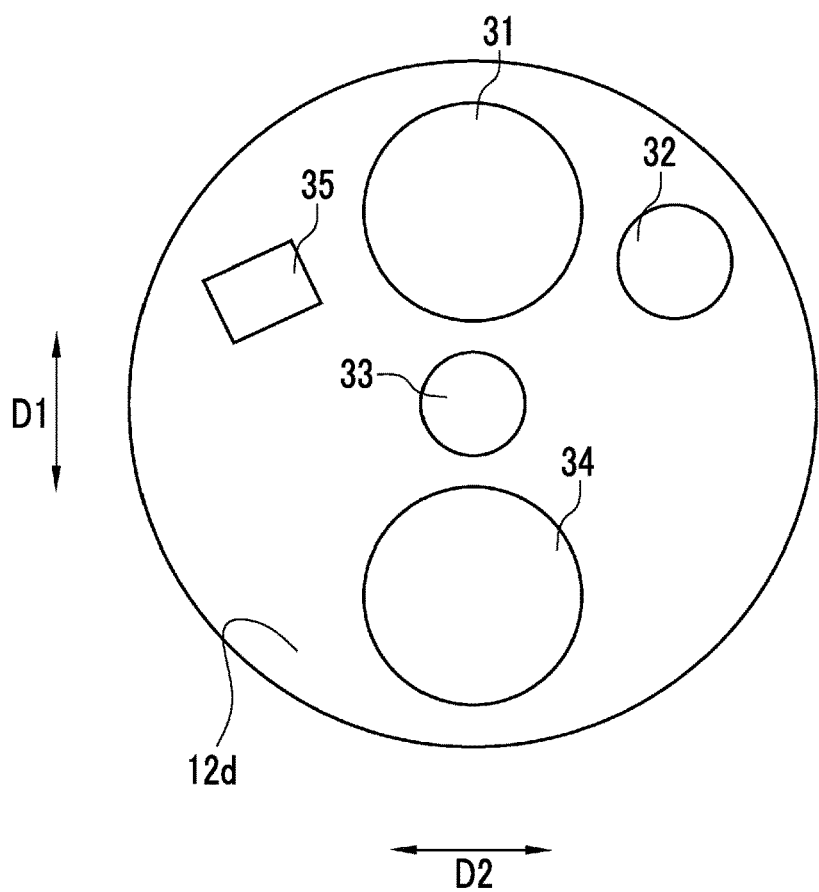
FIG. 2 is a plan view of a distal end part of an endoscope.

As shown in FIG. 2, a distal end part 12d of the endoscope 12 has a substantially circular shape, and is provided with an objective lens 31 that is positioned closest to a subject among optical members of an image pickup optical system of the endoscope 12, an illumination lens 32 that is used to irradiate the subject with illumination light, an auxiliary measurement light lens 33 that is used to illuminate the subject with auxiliary measurement light to be described later, an opening 34 that allows a treatment tool to protrude toward the subject, and an air/water supply nozzle 35 that is used to supply air and water.

An optical axis Ax (see FIG. 6) of an image pickup optical system 44b (see FIG. 3) extends in a direction perpendicular to the plane of paper. A vertical first direction D1 is orthogonal to the optical axis Ax, and a horizontal second direction D2 is orthogonal to the optical axis Ax and the first direction D1. The objective lens 31 and the auxiliary measurement light lens 33 are arranged in the first direction D1.

Figure 3:
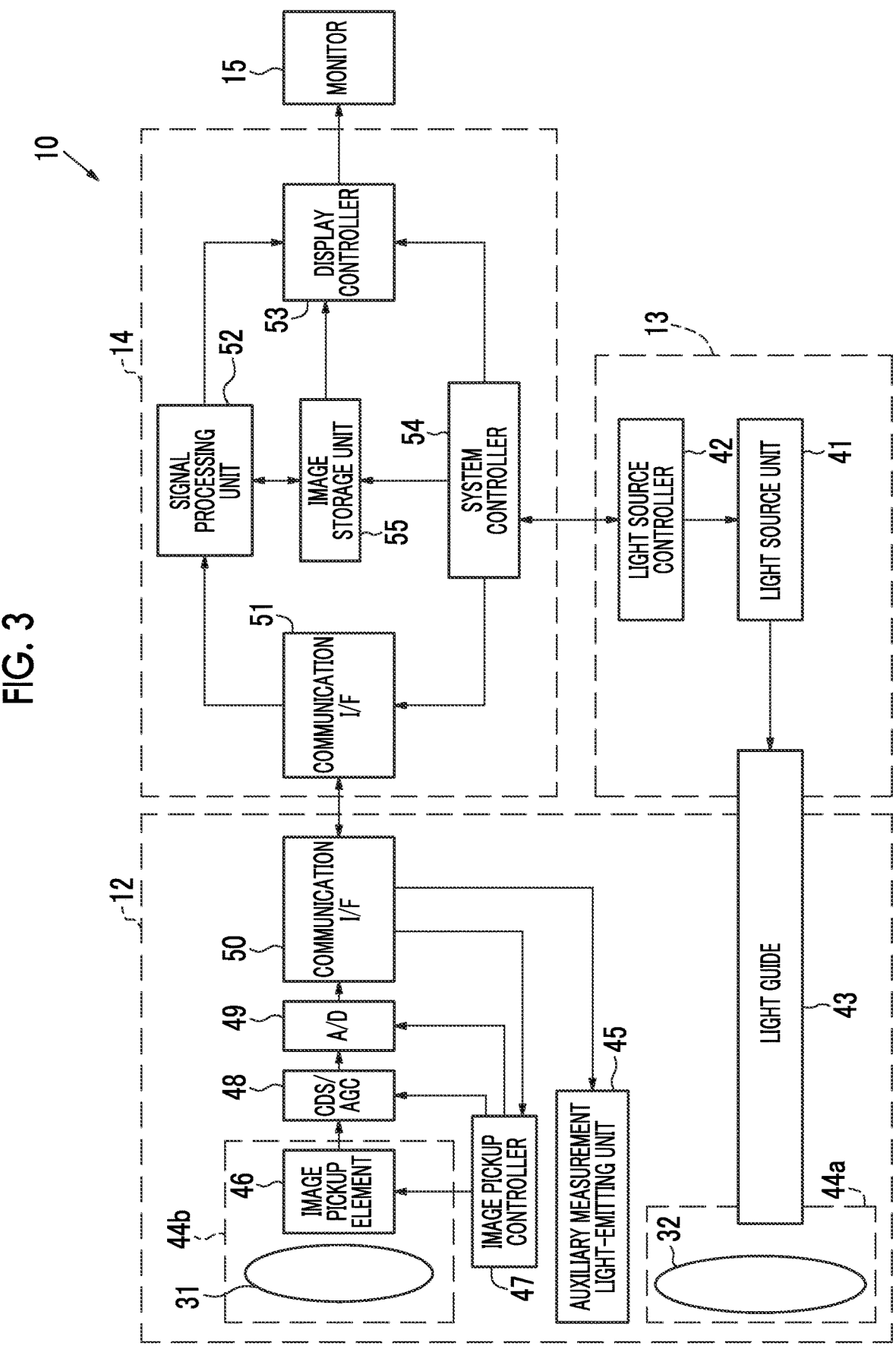
FIG. 3 is a block diagram showing the functions of the endoscope apparatus.

As shown in FIG. 3, the light source device 13 comprises a light source unit 41 and a light source controller 42. The light source unit 41 (illumination light source unit) generates illumination light that is used to illuminate the subject. The illumination light, which is emitted from the light source unit 41, is incident on a light guide 43, and the subject is irradiated with the illumination light through the illumination lens 32. A white light source emitting white light, a plurality of light sources, which include a white light source and a light source emitting another color light (for example, a blue light source emitting blue light), or the like is used as a light source of the illumination light in the light source unit 41. In this embodiment, the function of an illumination light switch, which is used to turn on or off the illumination light, is set in the above-mentioned light source button 13a.

An illumination optical system 44a, an image pickup optical system 44b, and an auxiliary measurement light-emitting unit (auxiliary measurement light source unit) 45 are provided in the distal end part 12*d* of the endoscope. The illumination optical system 44*a* includes the illumination lens 32, and the object to be observed is irradiated with light, which is emitted from the light guide 43, through the illumination lens 32. The image pickup optical system 44*b* includes the objective lens 31 and an image pickup element 46. Light reflected from the object to be observed is incident on the image pickup element 46 through the objective lens 31. Accordingly, the reflected image of the object to be observed is formed on the image pickup element 46. The auxiliary measurement light-emitting unit 45 emits auxiliary measurement light that is used for the measurement of the subject.

The image pickup element 46 is a color image pickup sensor, and picks up the reflected image of the subject and outputs image signals. It is preferable that the image pickup element 46 is a charge coupled device (CCD) image pickup sensor, a complementary metal-oxide semiconductor (CMOS) image pickup sensor, or the like. The image pickup element 46 used in the embodiment of the present invention is a color image pickup sensor that is used to obtain RGB image signals corresponding to three colors of R (red), G (green), and B (blue). The image pickup element 46 is controlled by an image pickup controller 47.

Image signals output from the image pickup element 46 are transmitted to a CDS/AGC circuit 48. The CDS/AGC circuit 48 performs correlated double sampling (CDS) or auto gain control (AGC) on the image signals that are analog signals. The image signals, which have been transmitted through the CDS/AGC circuit 48, are converted into digital image signals by an analog/digital converter (A/D converter) 49. The digital image signals, which have been subjected to A/D conversion, are input to the processor device 14 through a communication interface (I/F) 50.

The processor device 14 comprises a communication I/F 51 that is connected to the communication I/F 50 of the endoscope 12, a signal processing unit 52, a display controller 53, a system controller 54, and the image storage unit 55. The communication I/F 51 receives the image signals, which are transmitted from the communication I/F 50 of the endoscope 12, and transmits the image signals to the signal processing unit 52. A memory, which temporarily stores the image signals received from the communication I/F 51, (not shown) is built in the signal processing unit 52, and the signal processing unit 52 processes an image signal group, which is a set of the image signals stored in the memory, to create a picked-up image.

The signal processing unit 52 creates a specific image in which a measured value marker is superimposed on the picked-up image. The creation of the specific image will be described later. Further, in a case where the endoscope 12 is set to the normal mode, the signal processing unit 52 may perform color conversion processing, color enhancement processing, and structure enhancement processing on the picked-up image to obtain a normal image. Since the normal image is an image obtained on the basis of normal light in which violet light V, blue light B, green light G, and red light R are emitted in a well-balanced manner, the normal image has a natural color tone. In a case where the endoscope 12 is set to the length measurement mode, the signal processing unit 52 may be adapted to perform structure enhancement processing for enhancing structures, such as blood vessels, or color difference enhancement processing for increasing a color difference between a normal area and a lesion area or the like of the object to be observed on the picked-up image.

The display controller 53 displays the picked-up image created by the signal processing unit 52, the specific image, or the picked-up image, such as the static image stored in the image storage unit 55, on the monitor 15. The system controller 54 performs the control of the image pickup element 46 through the image pickup controller 47 provided in the endoscope 12, and performs the control of the image stored in the image storage unit 55. The image pickup controller 47 performs the control of the CDS/AGC circuit 48 and the A/D converter 49 in accordance with the control of the image pickup element 46, and sends information to the light source controller 42. The image storage unit 55 stores the static image of a picked-up image, a specific image to be described later in which a measured value marker is superimposed on the picked-up image, a picked-up image that includes information about a measured value, or the like. The picked-up image or the specific image stored in the image storage unit 55 is a static image or a video.

Figure 4:
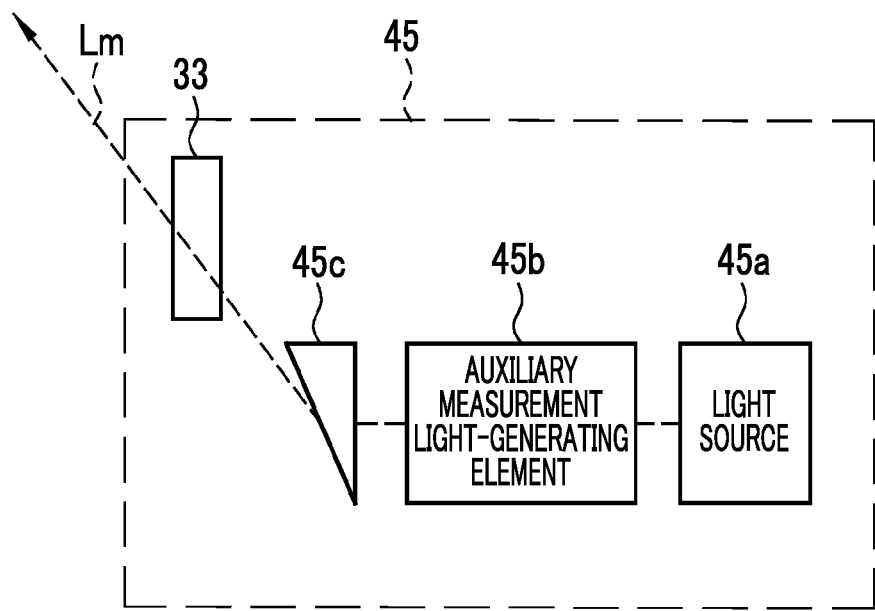
FIG. 4 is a block diagram showing the functions of an auxiliary measurement light-emitting unit.

As shown in FIG. 4, the auxiliary measurement light-emitting unit 45 comprises a light source 45*a*, an auxiliary measurement light-generating element 45*b*, a prism 45*c*, and the auxiliary measurement light lens 33. The light source 45*a* emits spot-like auxiliary measurement light that is used for the measurement of the subject. The light source 45*a* is to emit light having a color that can be detected by pixels of the image pickup element 46 (specifically, visible light), and includes a light emitting element, such as a laser light source LD (laser diode) or a light emitting diode (LED), and a condenser lens that condenses light emitted from the light emitting element.

It is preferable that light emitted from the light source 45*a* is red light having a wavelength in a range of, for example, 600 nm to 650 nm. Alternatively, green light having a wavelength in a range of 495 nm to 570 nm may be used. The auxiliary measurement light-generating element 45*b* converts light, which is emitted from the light source, into the auxiliary measurement light that is used to obtain measurement information. In order to convert the light into the auxiliary measurement light, the auxiliary measurement light-generating element 45*b* specifically uses a collimator lens, a diffractive optical element (DOE), or the like.

The prism 45*c* is an optical member that is used to change the travel direction of the auxiliary measurement light converted by the auxiliary measurement light-generating element 45*b*. The prism 45*c* changes the travel direction of the auxiliary measurement light so that the auxiliary measurement light intersects with the visual field of the image pickup optical system including the objective lens 31 and a lens group. The details of the travel direction of the auxiliary measurement light will be described later. A subject is irradiated with auxiliary measurement light, which is emitted from the prism 45*c*, through the auxiliary measurement light lens 33.

The subject is irradiated with the auxiliary measurement light, so that a specific region is formed on the subject. The communication I/F 51, which is an image acquisition unit, acquires a picked-up image obtained from the image pickup of the subject which is illuminated with the illumination light and on which a spot is formed by the auxiliary measurement light. The position of the spot in the picked-up image, which is acquired by the communication I/F 51, is specified by a position specifying section 61 (see FIG. 7). A reference scale setting section sets a reference scale according to the specified position of the spot, and a measured value marker generating section generates a measured value marker indicating an actual size on the basis of the reference scale. The generated measured value marker is superimposed on the picked-up image and the picked-up image is displayed on the monitor 15 as a specific image.

Figure 5:
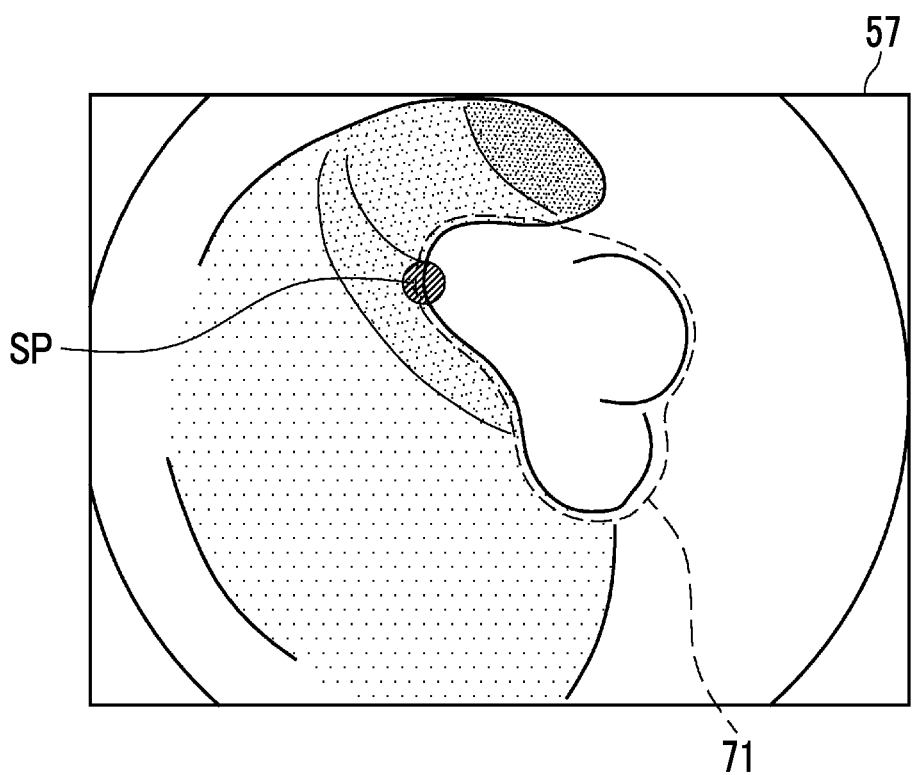
FIG. 5 is an image diagram of an example of a picked-up image including a subject on which a spot SP is formed.

As shown in FIG. 5, a specific region in a case where the auxiliary measurement light has the shape of a spot is a spot SP formed of a circular region. A picked-up image 57 includes a subject including a polyp 71, and a spot SP is formed at the end portion of the polyp 71. The position specifying section 61 (see FIG. 7) specifies the position of the spot SP. The picked-up image 57 shows a state displayed on the monitor 15.

An auxiliary measurement slit, which is formed at the distal end part 12*d* of the endoscope, may be used instead of the auxiliary measurement light lens 33. Further, it is preferable that an anti-reflection coating (AR coating) (anti-reflection portion) is provided on the auxiliary measurement light lens 33. The reason why the anti-reflection coating is provided as described above is that it is difficult for the position specifying section 61 (see FIG. 7) to recognize the position of the spot SP formed on the subject by the auxiliary measurement light in a case where the auxiliary measurement light is reflected without being transmitted through the auxiliary measurement light lens 33 and a ratio of the auxiliary measurement light with which a subject is irradiated is reduced.

The auxiliary measurement light-emitting unit 45 has only to be capable of emitting the auxiliary measurement light to the visual field of the image pickup optical system. For example, the light source 45*a* may be provided in the light source device and light emitted from the light source 45*a* may be guided to the auxiliary measurement light-generating element 45*b* by optical fibers. Further, the prism 45*c* may not be used and the orientations of the light source 45*a* and the auxiliary measurement light-generating element 45*b* may be inclined with respect to the optical axis Ax of the image pickup optical system 44*b* so that the auxiliary measurement light is emitted in a direction crossing the visual field of the image pickup optical system.

Figure 6:
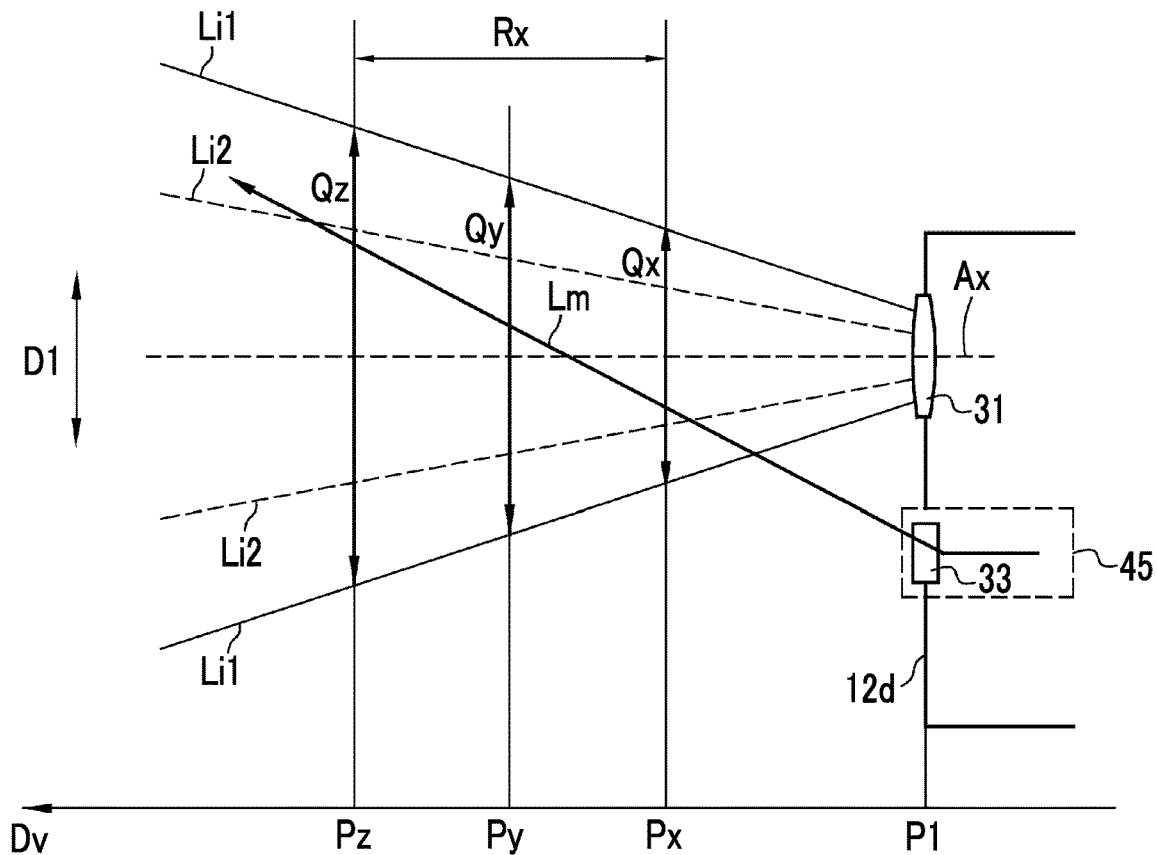
FIG. 6 is a diagram illustrating the position of the spot SP that is formed on a subject by auxiliary measurement light.

In a case where the auxiliary measurement light is emitted in the length measurement mode, with regard to the travel direction of the auxiliary measurement light, the spot-like auxiliary measurement light is emitted in a state where the optical axis Lm of the auxiliary measurement light intersects with the optical axis Ax of the objective lens and the optical axis Lm of the auxiliary measurement light is in the image pickup angle of view of the image pickup optical system (in a region between two solid lines Li1) as shown in FIG. 6. In a case where the subject can be observed in a range Rx of an observation distance, it is understood that the positions (points where the respective arrows Qx, Qy, and Qz intersect with the optical axis Lm) of the spot SP, which is formed on the subject by the auxiliary measurement light, in image pickup ranges (shown by the arrows Qx, Qy, and Qz) at a near end Px, an intermediate vicinity Py, and a far end Pz of the range Rx are different from each other. The position of the distal end part 12*d* of the endoscope is defined as a position P1. The observation distance is a distance between the distal end part 12*d* of the endoscope and the subject. Accordingly, the observation distance is a distance between the position P1 and the near end Px, the intermediate vicinity Py, or the far end Pz. In detail, the observation distance is a distance between the starting point of the optical axis Ax of the image pickup optical system 44*b* of the distal end part 12*d* of the endoscope and the subject. An axis Dv represents the observation distance. The image pickup angle of view of the image pickup optical system is represented by the region between the two solid lines Li1, and measurement is performed in a central region (a region between two dotted lines Li2), in which an aberration is small, of this image pickup angle of view.

Since the auxiliary measurement light is emitted in a state where the optical axis of the measurement light Lm is in the image pickup angle of view of the image pickup optical system as described above, the sensitivity of the movement of the position of the spot to a change in the observation distance is high. Accordingly, the size of the subject can be measured with high accuracy. The image of the subject illuminated with the auxiliary measurement light is picked up by the image pickup element 46, so that a picked-up image including the spot SP is obtained. In the picked-up image, the position of the spot SP varies depending on a relationship between the optical axis Ax of the image pickup optical system 44*b* and the optical axis Lm of the auxiliary measurement light and the observation distance. However, the number of pixels showing the same actual size (for example, 5 mm) is increased in the case of a short observation distance, and the number of pixels showing the same actual size is reduced in the case of a long observation distance. Accordingly, in a case where correspondence information (a scale table 65, see FIG. 8) in which the position of the spot SP and measurement information (the number of pixels) corresponding to the actual size of the subject are associated with each other is stored in advance, measurement information and a reference scale can be set from the position of the spot SP.

Figure 7:
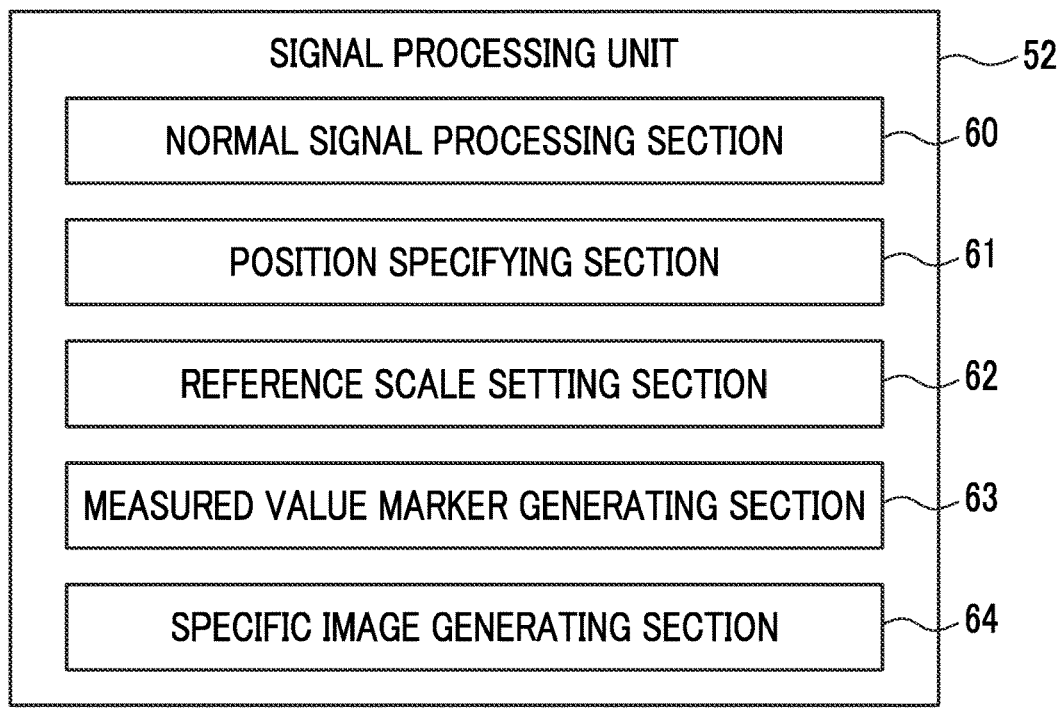
FIG. 7 is a block diagram showing the functions of a signal processing unit.

As shown in FIG. 7, the signal processing unit 52 of the processor device 14 comprises a normal signal processing section 60, a position specifying section 61, a reference scale setting section 62, a measured value marker generating section 63, and a specific image generating section 64. The normal signal processing section 60 processes the picked-up image in the normal mode. The position specifying section 61 specifies the position of the spot SP formed on the subject in the picked-up image in order to perform the setting of a reference scale, and the like. The reference scale setting section 62 sets the reference scale, which indicates the actual size of the subject, on the basis of the position of the spot SP. The measured value marker generating section 63 generates a measured value marker, which indicates a measured value obtained from the measurement of a measurement portion of a region of interest, on the basis of the set reference scale.

The region of interest is a region which is included in the subject and to which a user is to pay attention. The region of interest is, for example, a polyp or the like, and is a region that is likely to need to be measured. Further, a measurement portion is a portion, of which the length or the like is to be measured, of the region of interest. For example, in a case where the region of interest is a reddened portion, a measurement portion is the longest portion or the like of the reddened portion. Alternatively, in a case where the region of interest has a circular shape, a measurement portion is a diameter portion or the like of the region of interest.

The specific image generating section 64 creates the specific image in which a measured value marker is superimposed on the picked-up image. The measured value marker is superimposed on the picked-up image so as to be aligned with the measurement portion of the region of interest. The specific image is displayed on the monitor 15 by the display controller 53.

In a case where the endoscope 12 is set to the length measurement mode, the light source unit 41 and the auxiliary measurement light-emitting unit 45 continuously emit the illumination light and the auxiliary measurement light. In some cases, the auxiliary measurement light may be turned on or dimmed to be emitted. The picked-up image is an RGB image corresponding to three colors, but may be other color images (brightness signal Y and color difference signals Cr and Cb). Accordingly, in a case where the endoscope 12 is set to the length measurement mode, the picked-up image of the subject illuminated with the illumination light and the auxiliary measurement light is input to the signal processing unit 52. The picked-up image is acquired by the communication I/F 51.

In a case where the endoscope 12 is set to the normal mode, the light source unit 41 constantly emits the illumination light. The subject is irradiated with the illumination light through the light guide 43. Since the light source 45*a* of the auxiliary measurement light-emitting unit 45 is stopped in the case of the normal mode, the auxiliary measurement light is turned off. Accordingly, in a case where the endoscope 12 is set to the normal mode, the picked-up image of the subject illuminated with the illumination light is input to the signal processing unit 52. The picked-up image is acquired by the communication I/F 51.

The position specifying section 61 specifies the position of the spot SP that is formed on the subject by the auxiliary measurement light. Specifying the position of the spot SP is performed on the basis of the picked-up image of the subject that is illuminated with the illumination light and the auxiliary measurement light in the length measurement mode. The picked-up image of the subject on which the spot SP is formed by the auxiliary measurement light is acquired through the image pickup optical system and the image pickup element.

It is preferable that the position specifying section 61 recognizes the position of the spot SP from an image, which includes a lot of components corresponding to the color of the measurement auxiliary light, of the picked-up image. Since the auxiliary measurement light includes, for example, a lot of red components, it is preferable that the position specifying section 61 recognizes the position of the spot SP from a red image of the picked-up image. As a method of recognizing the position of the spot SP, there is, for example, a method that includes binarizing the red image of the picked-up image and recognizing the centroid of a white portion (pixel at which the signal intensity is higher than a threshold value for binarization) of the binarized image as the position of the spot SP.

Figure 8:
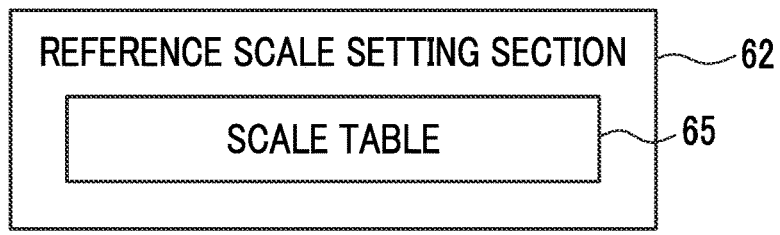
FIG. 8 is a block diagram showing the function of a reference scale setting section.

As shown in FIG. 8, the reference scale setting section 62 comprises a scale table 65. The scale table 65 is correspondence information in which the position of the spot SP and measurement information corresponding to the actual size of the subject are associated with each other. A method of creating the scale table 65 will be specifically described. A relationship between the position of the spot SP and the size of a marker (measurement information) can be obtained from the image pickup of a chart in which patterns having an actual size are regularly formed. For example, spot-like auxiliary measurement light is emitted to the chart; the image of a graph paper-shaped chart including lines (5 mm) having the same size as the actual size or lines (for example, 1 mm) having a size smaller than the actual size is picked up while an observation distance is changed to change the position of a spot; and a relationship between the position of the spot (the pixel coordinates of the spot on the imaging surface of the image pickup element 46) and the number of pixels corresponding to the actual size (the number of pixels representing an actual size of 5 mm) is acquired.

Figure 9:
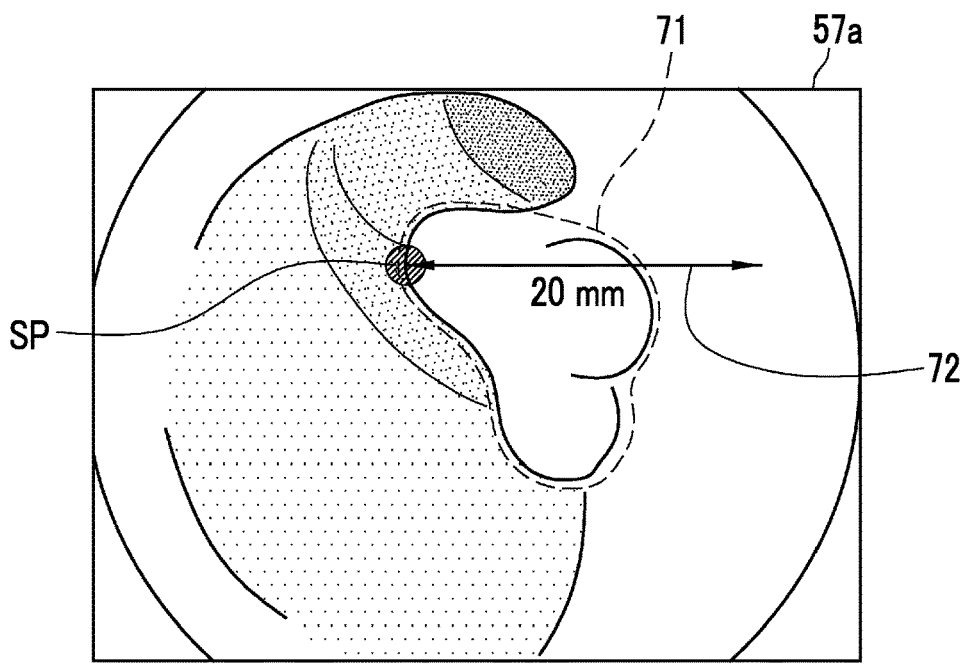
FIG. 9 is an image diagram of an example of a picked-up image on which a reference scale is superimposed and displayed.

In the length measurement mode, the picked-up image 57 of which the subject including the polyp 71 as an object to be observed is illuminated with the illumination light and the auxiliary measurement light is input to the signal processing unit 52. As shown in FIG. 9, in a picked-up image 57*a*, a polyp 71 has, for example, a three-dimensional shape in which spheres overlap with each other. For example, a spot SP is formed at the end portion of the polyp 71. The position specifying section 61 specifies the position of the spot SP on the basis of the picked-up image 57*a*. The reference scale setting section 62 sets a reference scale 72, which indicates the actual size of the subject corresponding to the specified position of the spot SP, with reference to the scale table 65.

The reference scale 72 includes, for example, a line segment that has the number of pixels corresponding to an actual size of 20 mm and a numerical value and a unit that represent the actual size. The reference scale 72 is not normally displayed on the monitor 15, but is displayed on the monitor 15 so as to be superimposed on the picked-up image 57 as in the picked-up image 57*a* in a case where the reference scale 72 is displayed on the monitor 15.

Figure 10:
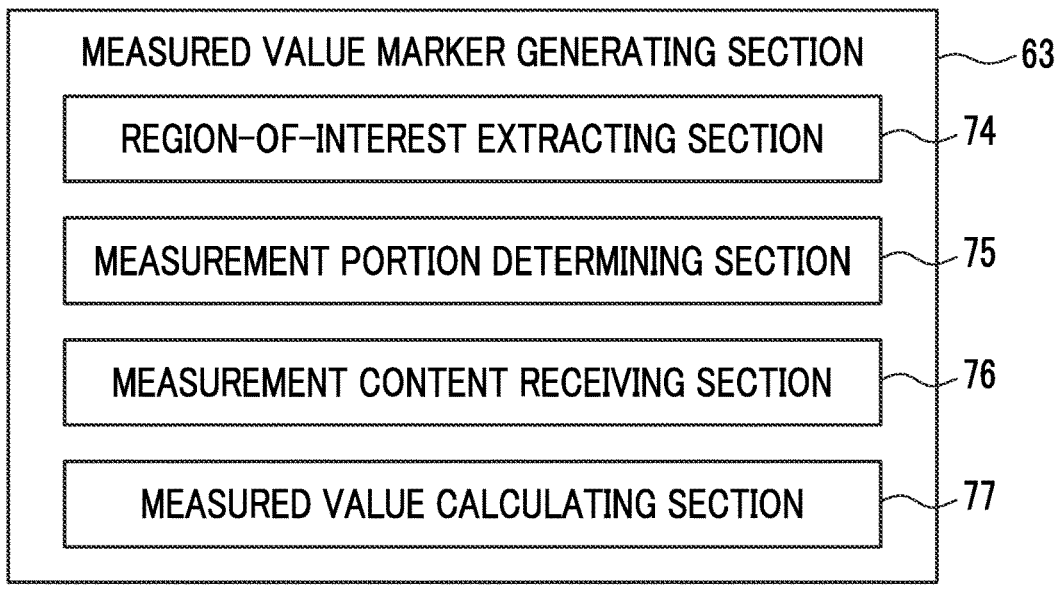
FIG. 10 is a block diagram showing the functions of a measured value marker generating section.

As shown in FIG. 10, the measured value marker generating section 63 comprises a region-of-interest extracting section 74, a measurement portion determining section 75, a measurement content receiving section 76, and a measured value calculating section 77. The region-of-interest extracting section 74 extracts the region of interest using an image processing technique, an image recognition technique, or the like. The region of interest is, for example, a region that is likely to need to be measured, such as a polyp. Therefore, according to an image processing technique, the region of interest can be extracted by the extraction or the like of an edge portion of the region of interest in the picked-up image. Further, according to the image recognition technique, the region of interest can be extracted by image recognition or the like using machine learning. The measurement portion determining section 75 determines a portion, which is to be measured, of the region of interest that is extracted by the region-of-interest extracting section 74. The measurement portion determining section 75 may determine a portion, which is selected depending on a preset reference, as the measurement portion or may determine a portion, which is selected according to an instruction regarding a measurement portion received by the measurement content receiving section 76, as the measurement portion. The measured value calculating section 77 calculates the number of pixels, which corresponds to a measured value marker, on the basis of the number of pixels corresponding to the reference scale 72 and the measurement portion.

Figure 11:
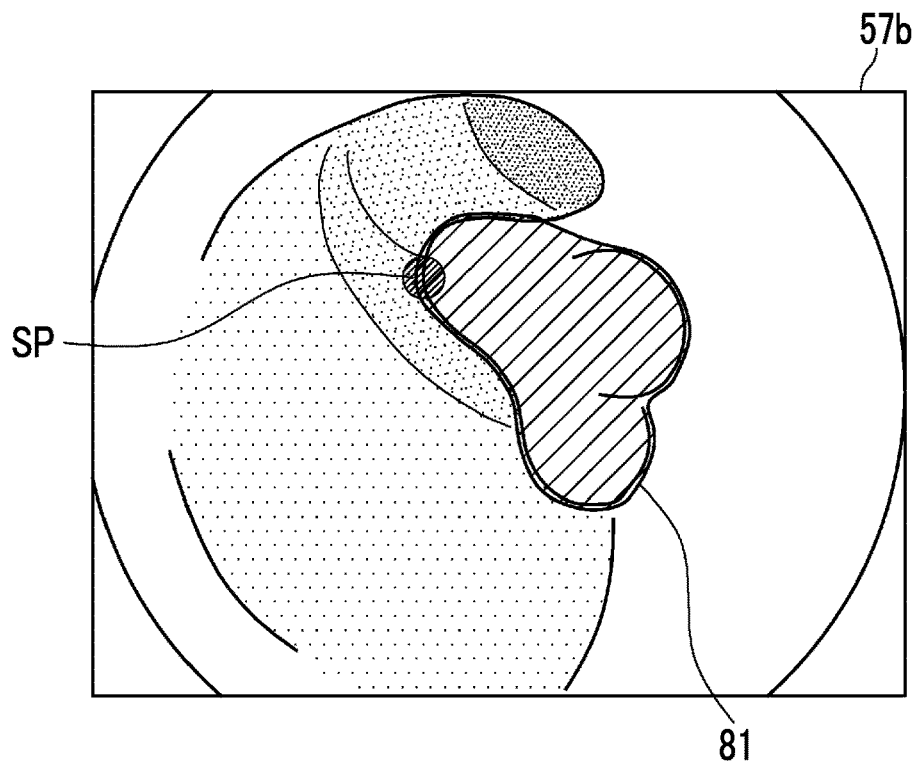
FIG. 11 is a diagram illustrating a region of interest.
Figure 12:
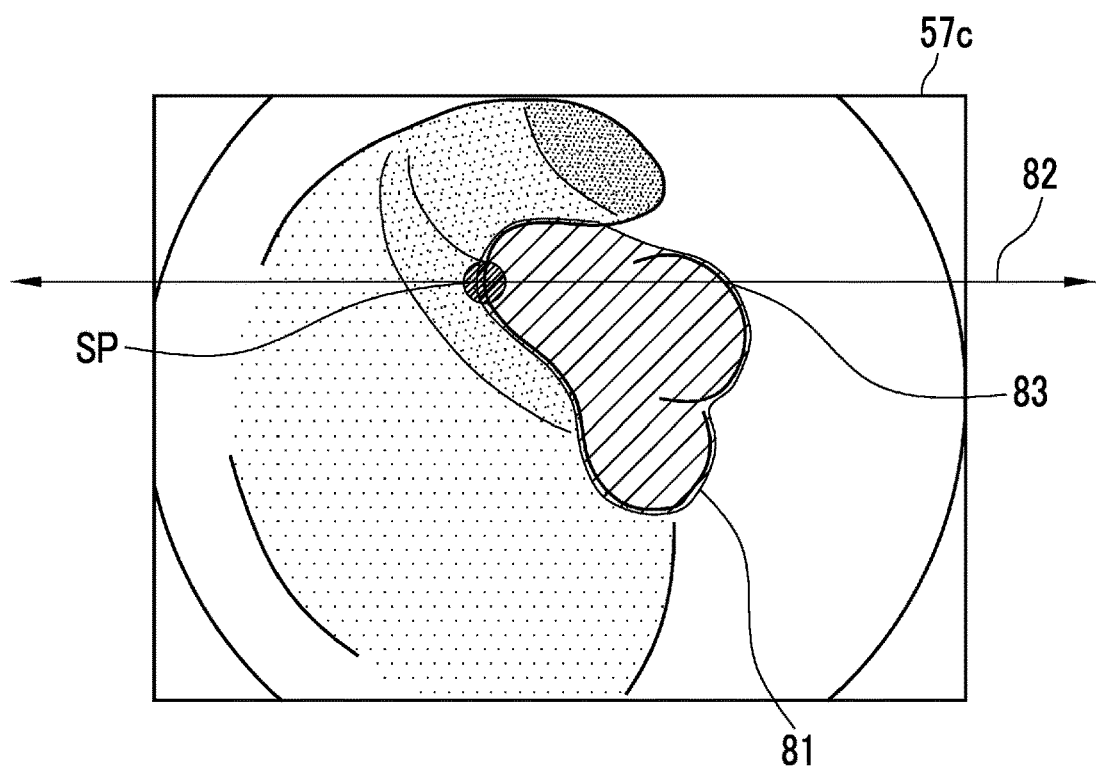
FIG. 12 is a diagram illustrating a horizontal direction and an edge portion in the horizontal direction.

The measurement portion determining section 75 determines, for example, the size of the region of interest in a horizontal direction, which is obtained in a case where the picked-up image 57 is displayed on the monitor 15, as the measurement portion. As shown in FIG. 11, the region-of-interest extracting section 74 extracts a hatched region as a region 81 of interest as in a picked-up image 57*b*. Then, as shown in FIG. 12, for example, in a case where the preset reference is a reference that is used to measure a portion of the region of interest in the horizontal direction with the spot SP as a base point, the measurement portion determining section 75 extracts a horizontal edge position 83, which is an intersection between the horizontal direction 82 and the edge of the region 81 of interest with the spot SP as the base point, as in a picked-up image 57*c*. A portion between the spot SP and the horizontal edge position 83 is a measurement portion.

For example, in a case where the actual size of the reference marker is denoted by L0, the number of pixels of the reference scale 72 in a case where the reference scale 72 is superimposed on the picked-up image 57 is denoted by Aa, the number of pixels of the measurement portion in a case where the reference scale 72 is superimposed on the measurement portion of the region 81 of interest in the picked-up image 57 is denoted by B a, and the actual size of the measured value marker 84 is denoted by L1, the measured value calculating section 77 generates the measured value marker so that the following equation (1) is satisfied.

$$L1=L0\times Ba/Aa \quad (1)$$

Figure 13:
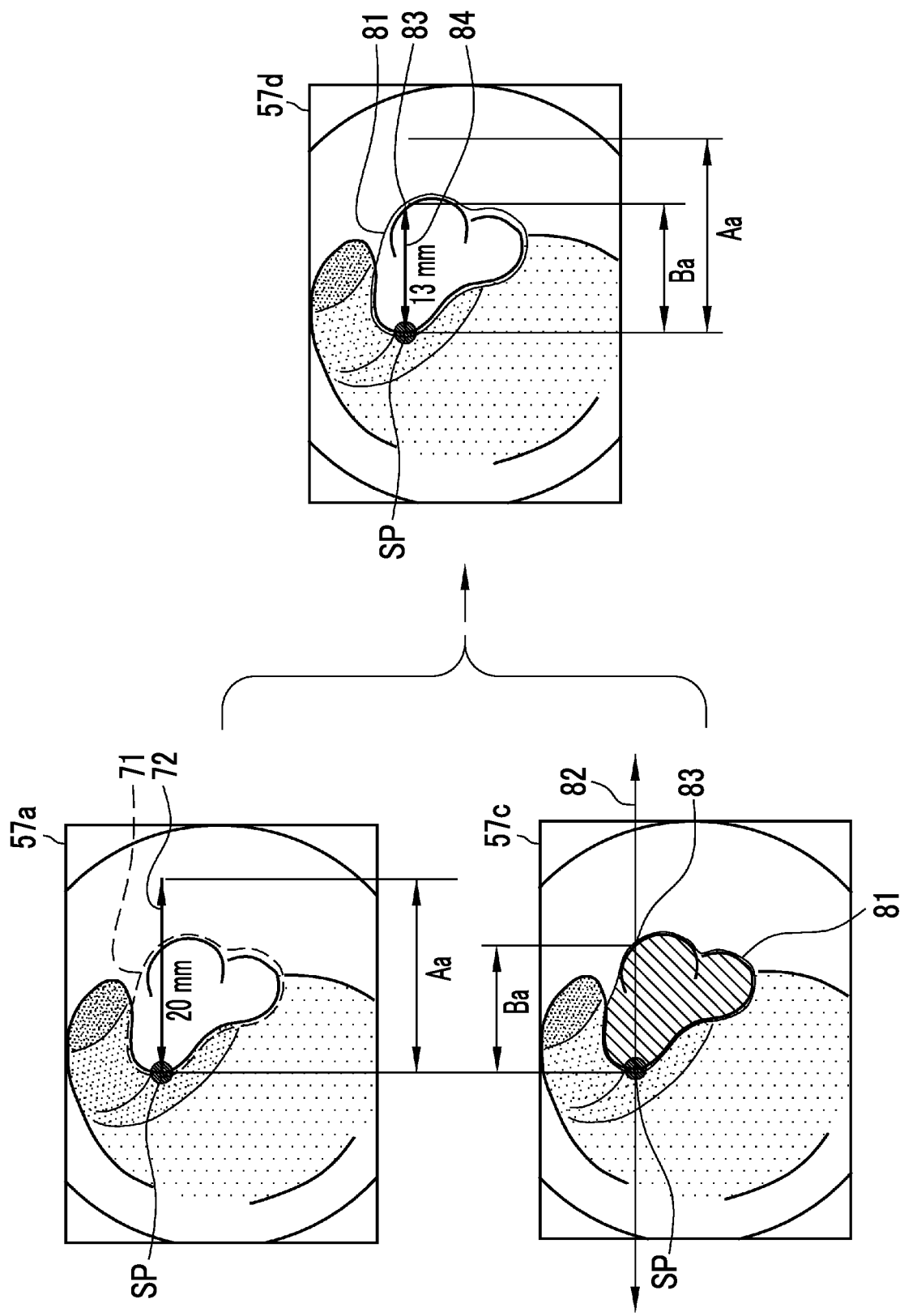
FIG. 13 is a diagram illustrating the creation of a specific image in which a measurement portion is in the horizontal direction.

As shown in FIG. 13, for example, in a case where Ba/Aa is 0.7 and the actual size of the reference scale 72 is 20 mm, the measured value calculating section 77 calculates the actual size of the measured value marker 84 as 13 mm as in a picked-up image 57d by using the number Aa of pixels corresponding to the reference scale 72 shown in the picked-up image 57a and the number Ba of pixels corresponding to the measurement portion between the spot SP and the horizontal edge position 83 shown in the picked-up image 57c.

Figure 14:
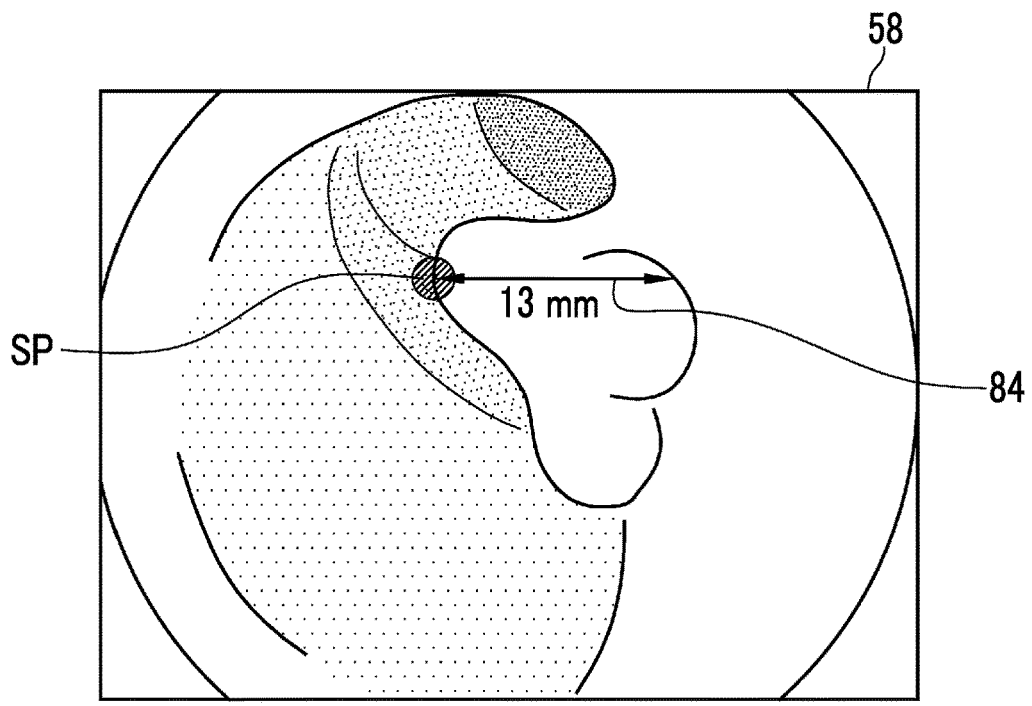
FIG. 14 is an image diagram of a specific image including a measured value marker that includes a line segment and a numerical value.
Figure 15:
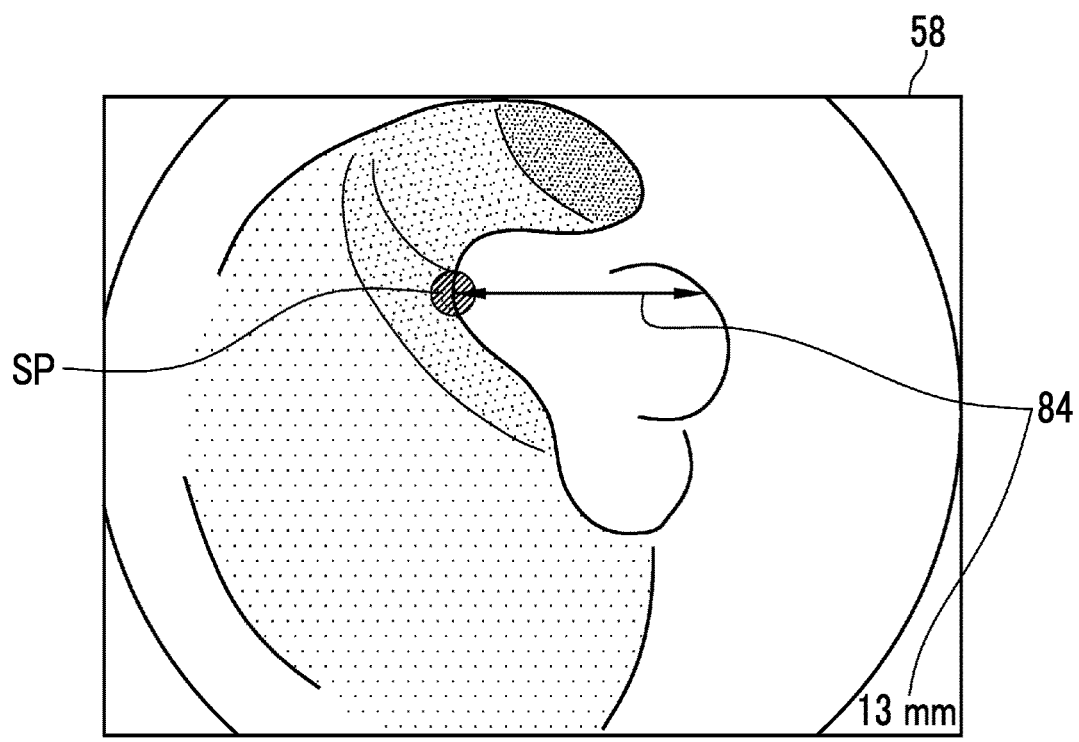
FIG. 15 is an image diagram of a specific image including a measured value marker of which a line segment and a numerical value are separated from each other.

The specific image generating section 64 creates a specific image 58 in which the measured value marker 84 is superimposed on the picked-up image 57. For example, as shown in FIG. 14, the calculated measured value marker 84 of which the actual size calculated is superimposed on the picked-up image 57 as a figure, such as an arrow, having the shape of a straight line segment. The specific image generating section 64 creates a specific image 58 in which the measured value marker 84 is superimposed on the picked-up image 57 so as to be aligned with the measurement portion of the region 81 of interest. The measured value marker 84 may include the numerical value of the actual size of the measured value marker 84 that is calculated by the measured value calculating section 77. As shown in FIG. 15, the numerical value of the actual size of the measured value marker 84 may be superimposed on the picked-up image 57 in a state where the numerical value is separated from the figure, such as an arrow, and a specific image 18 is formed.

Figure 16:
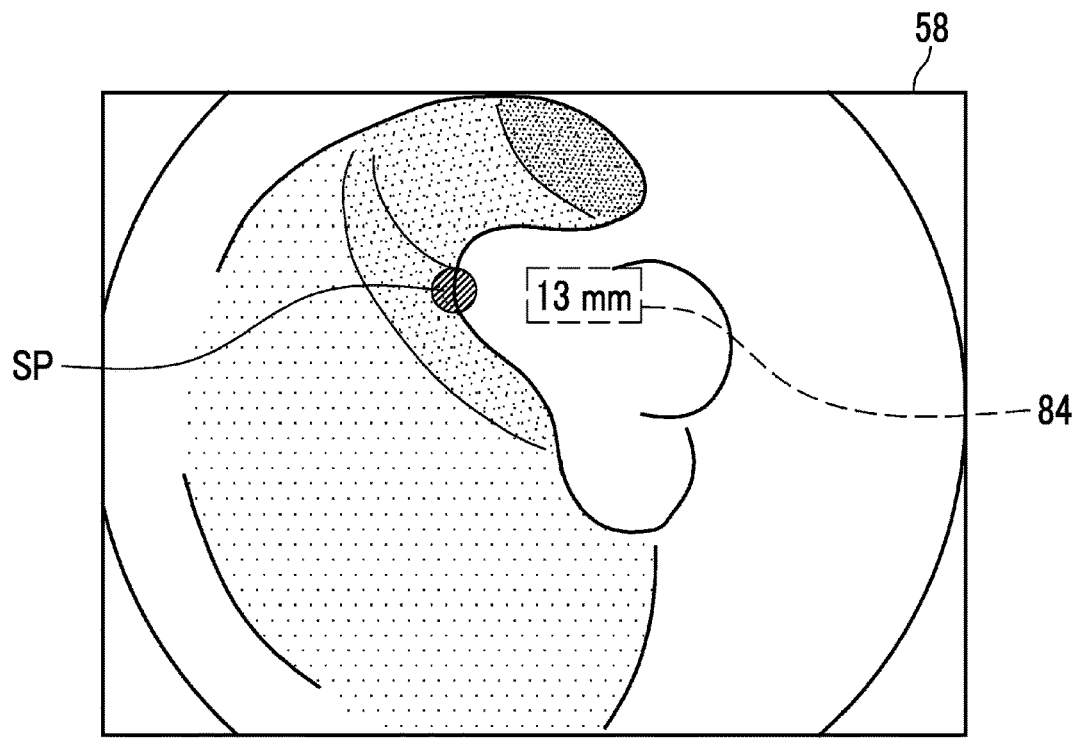
FIG. 16 is an image diagram of a specific image including a measured value marker that consists of a numerical value.
Figure 17:
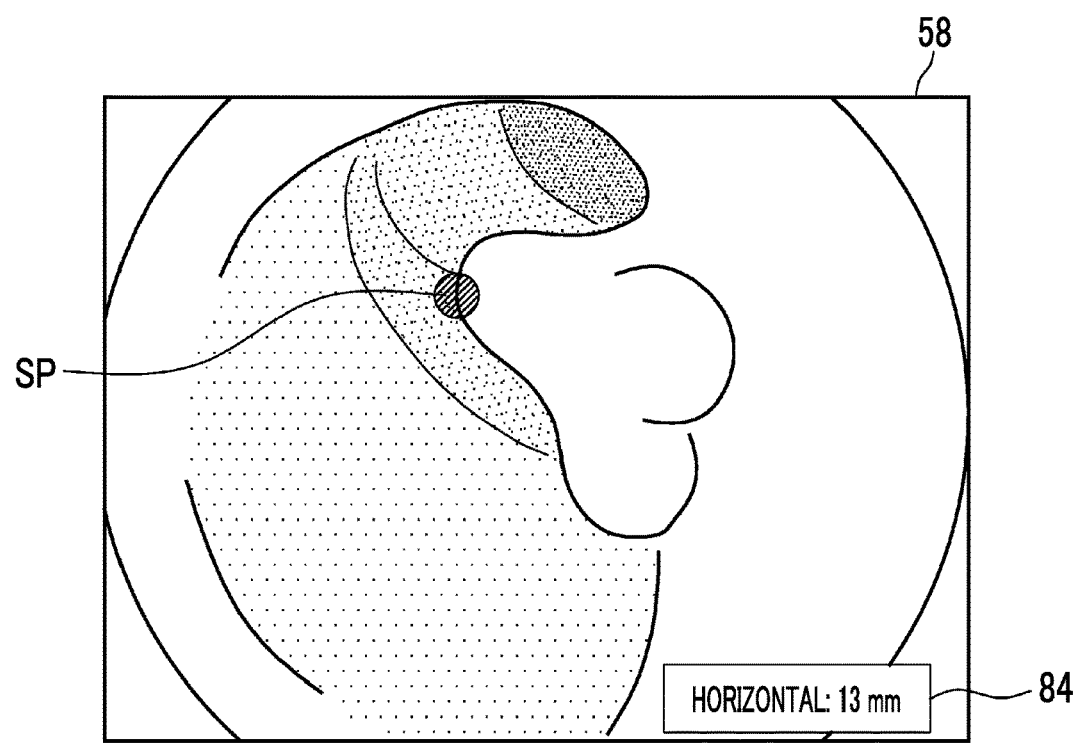
FIG. 17 is an image diagram of a specific image including a measured value marker that is positioned outside a region of interest.

Further, the measured value marker 84 may be a numeral itself that represents a measured value. For example, as shown in FIG. 16, the unit of a size, which is a length, and the numeral of the measured value may be displayed as the measured value marker 84 substantially at the position of the measurement portion. The unit may not be displayed. Furthermore, the specific image generating section 64 may create a specific image 58 in which the measured value marker 84 is superimposed on the picked-up image 57 at a portion other than the measurement portion of the region 81 of interest. For example, as shown in FIG. 17, the specific image generating section 64 may create a specific image 58 in which a display indicating the measurement portion and a numeral representing the measured value may be superimposed as the measured value marker 84 in the form of "horizontal: 13 mm" at a lower right portion of the specific image 58.

The type of the measured value marker 84 is selected by presetting. The measurement content receiving section 76 receives the setting of the content of the measured value marker 84 and sends the content of the measured value marker 84 to the measured value marker generating section 63, and the specific image generating section 64 creates a specific image 58 using the measured value marker 84 that is generated by the measured value marker generating section 63 on the basis of the content of the measured value marker 84.

In a case where a user observes an object to be measured with an endoscope, the region of interest, which is the object to be measured, is automatically measured using the spot SP and a measured region and/or a measured value is displayed on the monitor 15 in an actual size in the endoscope apparatus 10 as described above. Accordingly, it is possible to simply measure the object to be measured with the endoscope apparatus 10.

Figure 31:
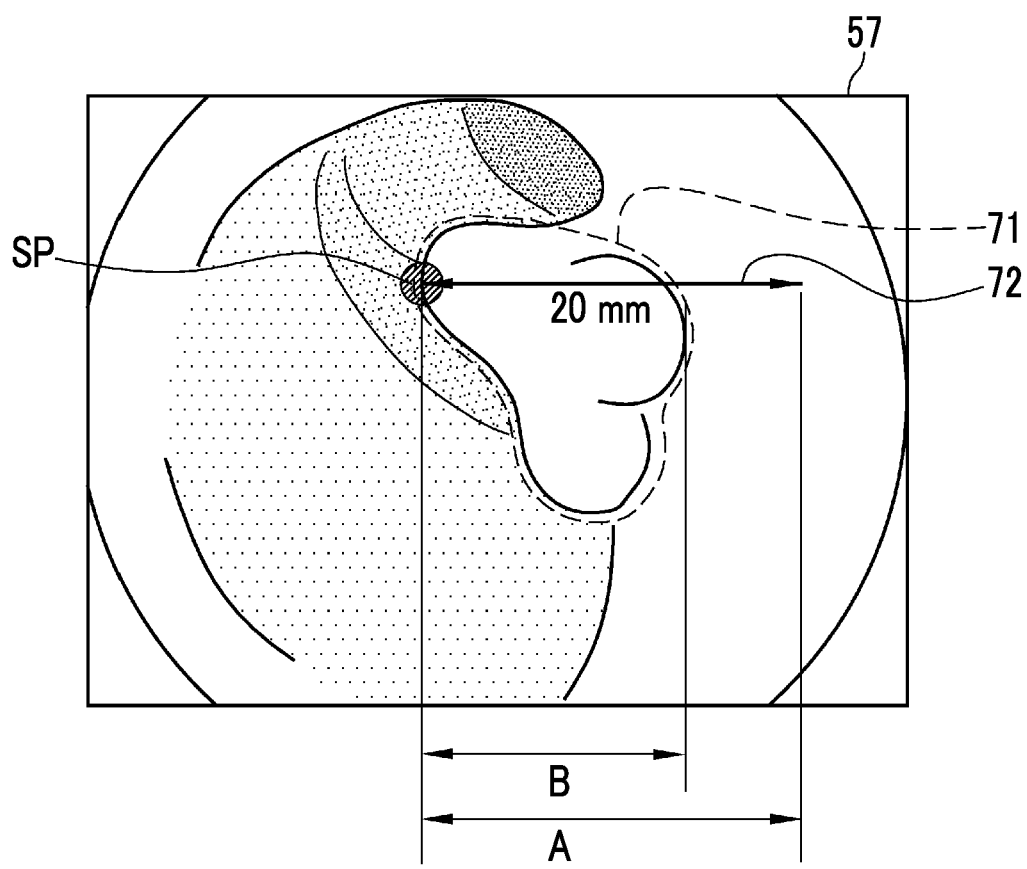
FIG. 31 is a diagram illustrating the measurement of a subject performed by a method in the related art.

In a case where a user compares a measured value marker including a preset fixed-sized scale with an object to be measured, the user has visually compared the numerical value of the measured value marker with the size of the object to be measured as shown in FIG. 31 (an example in the related art) to estimate and measure the actual size of the object to be measured. According to the endoscope apparatus 10, the actual size of the object to be measured can be automatically displayed using a line segment and a numerical value. Therefore, according to the endoscope apparatus 10, the number of steps of work procedure is reduced and measurement time is shortened, so that not only the object to be measured is simply measured but also measurement accuracy is improved.

Figure 18:
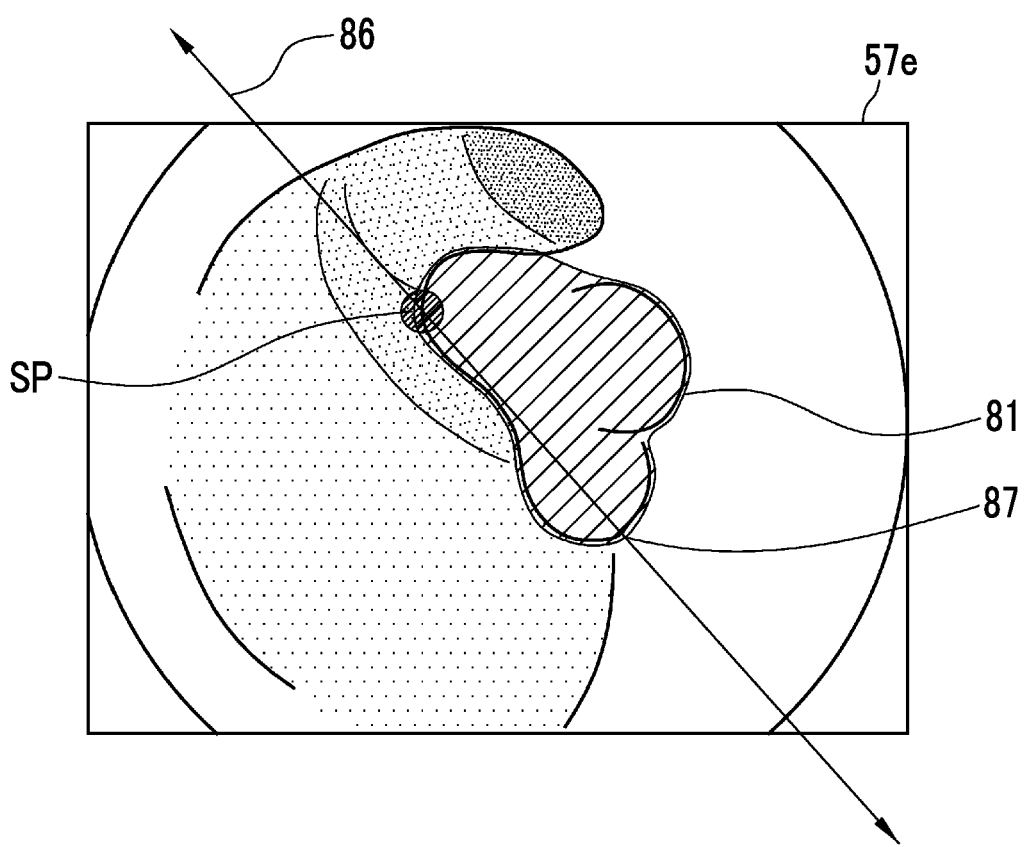
FIG. 18 is a diagram illustrating an extension direction.

For example, in a case where the spot SP is present on the region 81 of interest and the spot SP is used as a base point, the measurement portion determining section 75 may determine a portion, of which the size from the base point is the maximum, of the region 81 of interest as the measurement portion. As shown in FIG. 18, for example, in a case where the spot SP is used as a base point and the preset reference is a reference that is used to measure a portion, of which the size from the base point is the maximum, of the region 81 of interest, the measurement portion determining section 75 extracts a portion, of which the size from the spot SP used as the base point is the maximum, of the region 81 of interest, that is, an extension edge position 87, which is an intersection between an extension direction 86 and the edge of the region 81 of interest, as in a picked-up image 57e. A distance between the spot SP and the extension edge position 87 is the measurement portion.

In a case where the number of pixels of the measurement portion is denoted by Bb and the actual size of the measured value marker 84 is denoted by L2 in the same manner as in Equation (1), the measured value calculating section 77 generates the measured value marker so that the following equation (2) is satisfied.

$$L2=L0\times Bb/Aa \quad (2)$$

Figure 19:
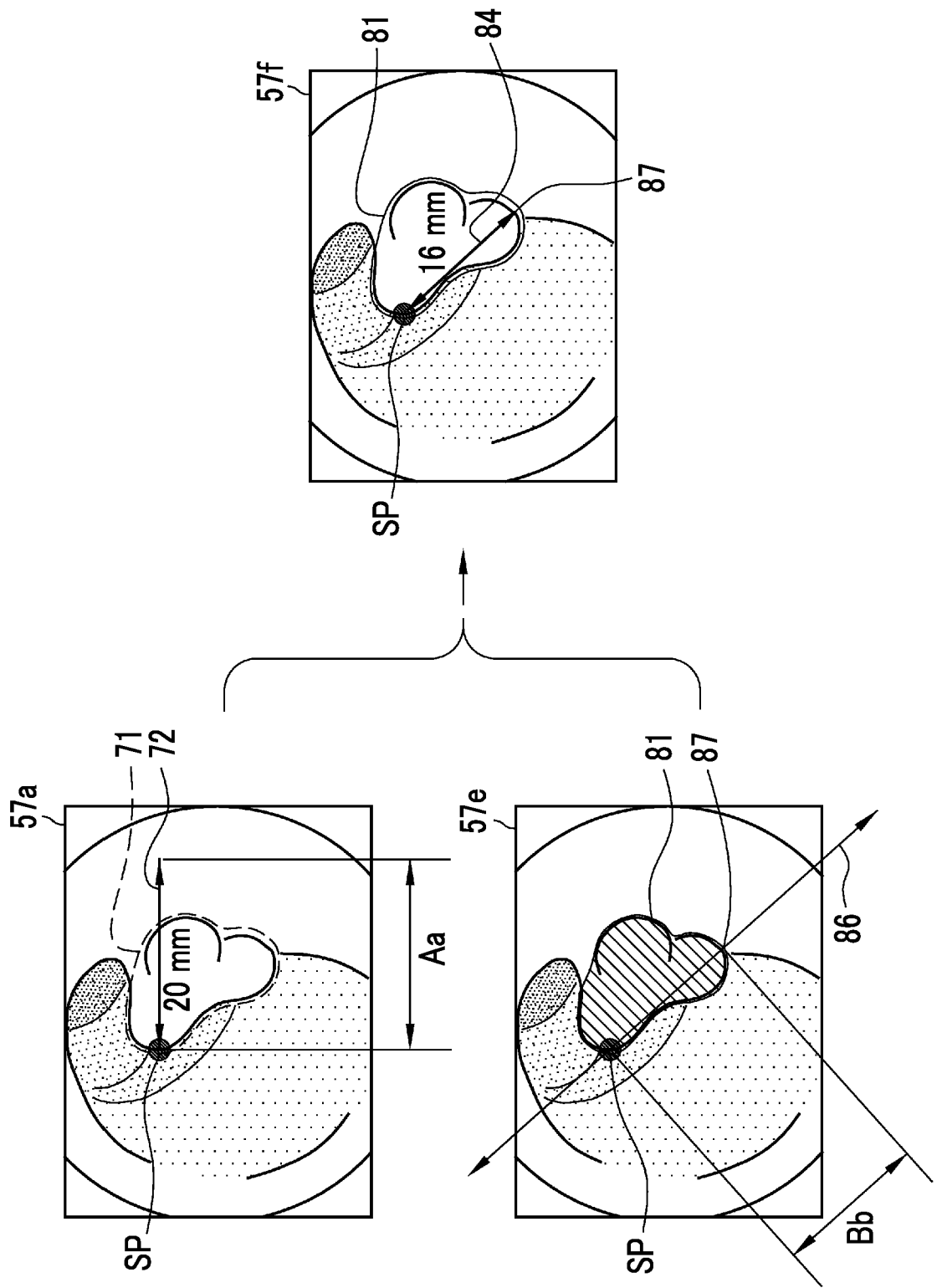
FIG. 19 is a diagram illustrating the creation of a specific image in which a measurement portion is in the extension direction and which includes a measured value marker.
Figure 20:
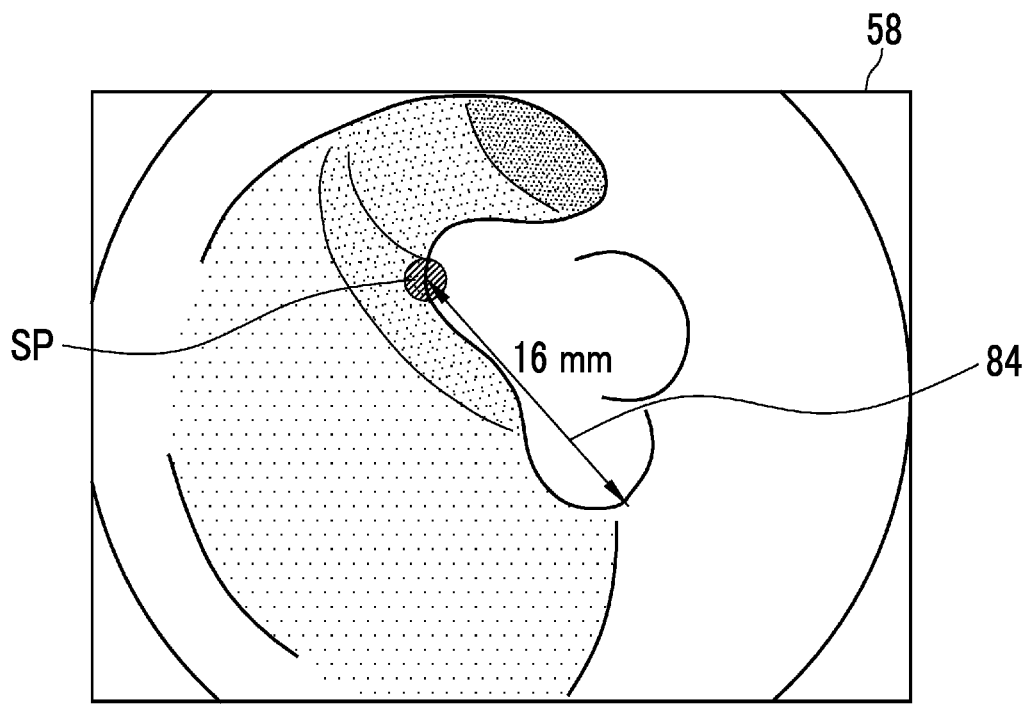
FIG. 20 is an image diagram of a specific image including a measured value marker that is measured in the extension direction.

As shown in FIG. 19, for example, in a case where Bb/Aa is 0.8 and the actual size of the reference scale 72 is 20 mm, the measured value calculating section 77 calculates the actual size of the measured value marker 84 as 16 mm as in a picked-up image 57f by using the number Aa of pixels corresponding to the reference scale 72 shown in the picked-up image 57a and the number Bb of pixels corresponding to the portion between the spot SP and the extension edge position 87 shown in the picked-up image 57e. As shown in FIG. 20, the measured value marker 84 obtained after calculation is displayed using a line segment, a numerical value, and a unit and a specific image 58 is obtained. In addition, the measured value marker 84 may be set as in the above-mentioned types.

Figure 21:
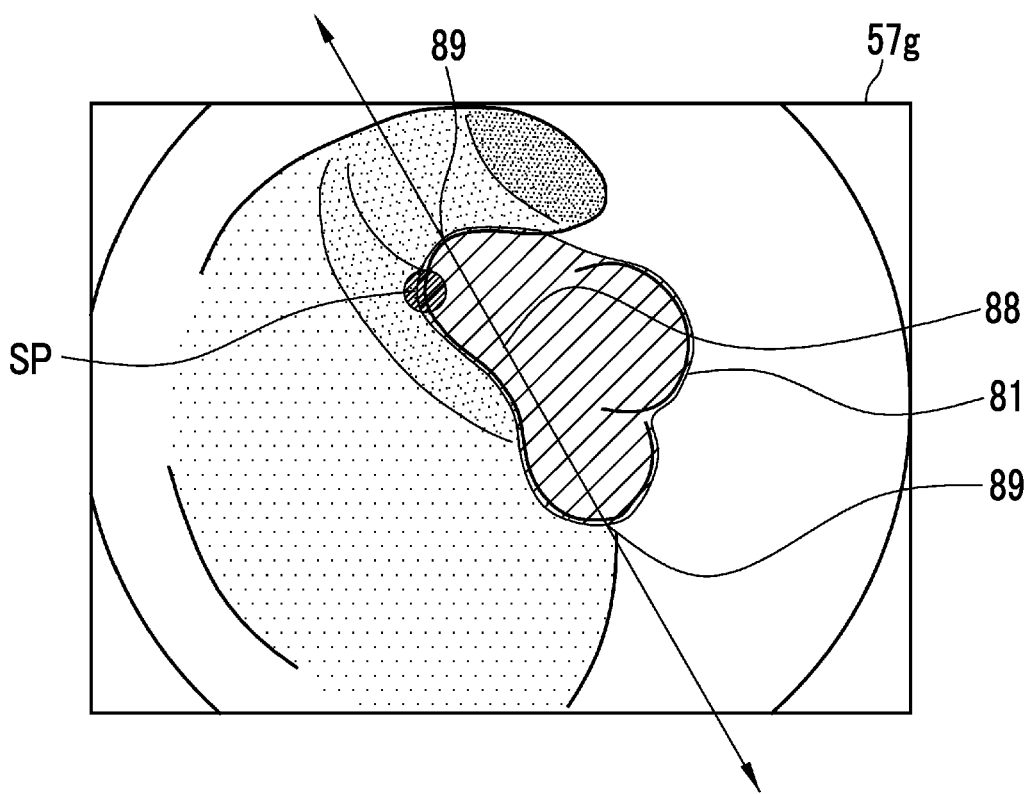
FIG. 21 is a diagram illustrating a maximum direction.

Further, the measurement portion determining section 75 may determine, for example, a portion, which has a maximum size in an arbitrary direction, of the region 81 of interest as the measurement portion. As shown in FIG. 21, for example, in a case where the preset reference is a reference that is used to measure a portion, which has the maximum size in an arbitrary direction, of the region 81 of interest, the measurement portion determining section 75 extracts portions, which have the maximum distance, of the region 81 of interest, that is, maximum edge positions 89, which are intersections between a maximum direction 88 and the edges of the region 81 of interest, as in a picked-up image 57g. A distance between the two maximum edge positions 89 is the measurement portion.

In a case where the number of pixels of the measurement portion is denoted by Bc and the actual size of the measured value marker 84 is denoted by L3 in the same manner as in Equation (1), the measured value calculating section 77 generates the measured value marker so that the following equation (3) is satisfied.

$$L3 = L0 \times Bc/Aa \qquad (3)$$

Figure 22:
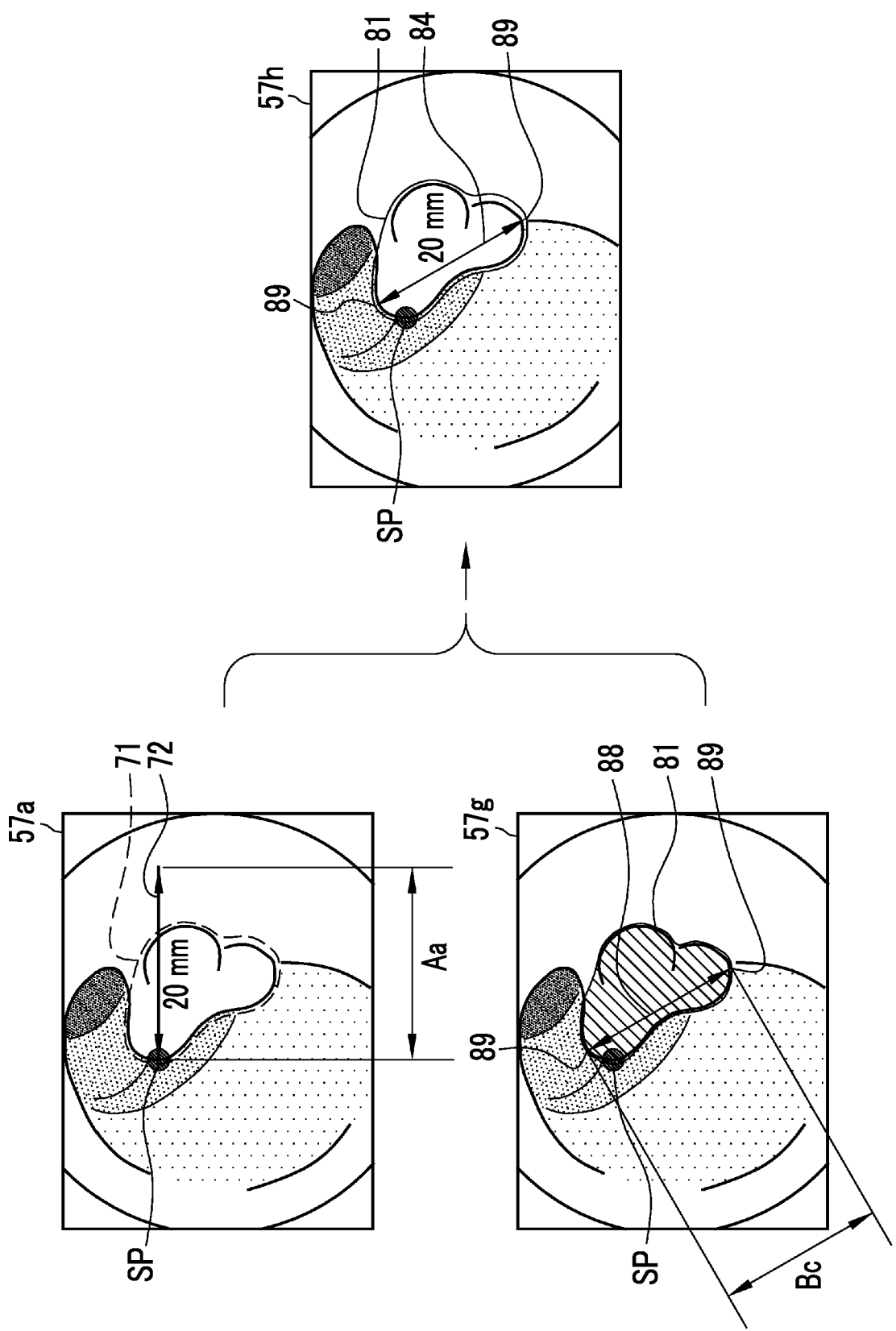
FIG. 22 is a diagram illustrating the creation of a specific image in which a measurement portion is in the maximum direction and which includes a measured value marker.
Figure 23:
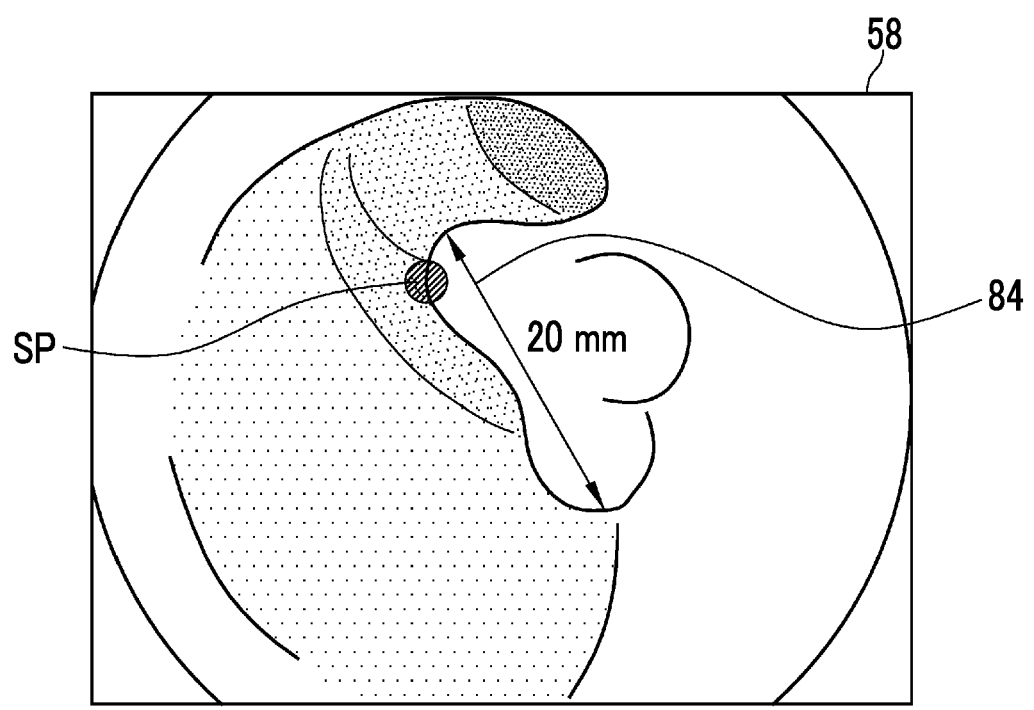
FIG. 23 is an image diagram of a specific image including a measured value marker that is measured in the maximum direction.

As shown in FIG. 22, for example, in a case where Bc/Aa is 1.0 and the actual size of the reference scale 72 is 20 mm, the measured value calculating section 77 calculates the actual size of the measured value marker 84 as 20 mm as in a picked-up image 57h by using the number Aa of pixels corresponding to the reference scale 72 shown in the picked-up image 57a and the number Bc of pixels corresponding to the measurement portion between the two maximum edge positions 89 shown in the picked-up image 57g. As shown in FIG. 23, the measured value marker 84 obtained after calculation is displayed using a line segment, a numerical value, and a unit and a specific image 58 is obtained. In addition, the measured value marker 84 may be set as in the above-mentioned types.

As described above, the measurement portion determining section 75 may determine a portion, which is selected according to an instruction regarding a measurement portion received by the measurement content receiving section 76, as the measurement portion. For example, the measurement content receiving section 76 receives an instruction regarding the selection of any of the horizontal edge position 83, the extension edge position 87, or the maximum edge positions 89 of the region 81 of interest.

For example, the scope button 12a or the left switch 17a, and/or the right switch 17b of the foot switch 17 can be used as the measurement content receiving section 76. In a case where one button or switch is used as the measurement content receiving section 76, for example, whenever the button or switch is pressed (on), the horizontal edge position 83, the extension edge position 87, and the maximum edge positions 89 may be adapted to be cyclically selected in this order so that the display of the measured value marker 84 is cyclically switched in this order in the specific image 58. Further, in a case where an instruction regarding one measurement portion is set in one button or switch, for example, the horizontal edge position 83 may be adapted to be selected at the time of pressing the scope button 12a, the extension edge position 87 may be adapted to be selected at the time of pressing the left switch 17a, and the maximum edge positions 89 may be adapted to be selected at the time of pressing the right switch 17b so that the display of the measured value marker 84 is also automatically switched in the specific image 58 according to the selection.

Figure 24:
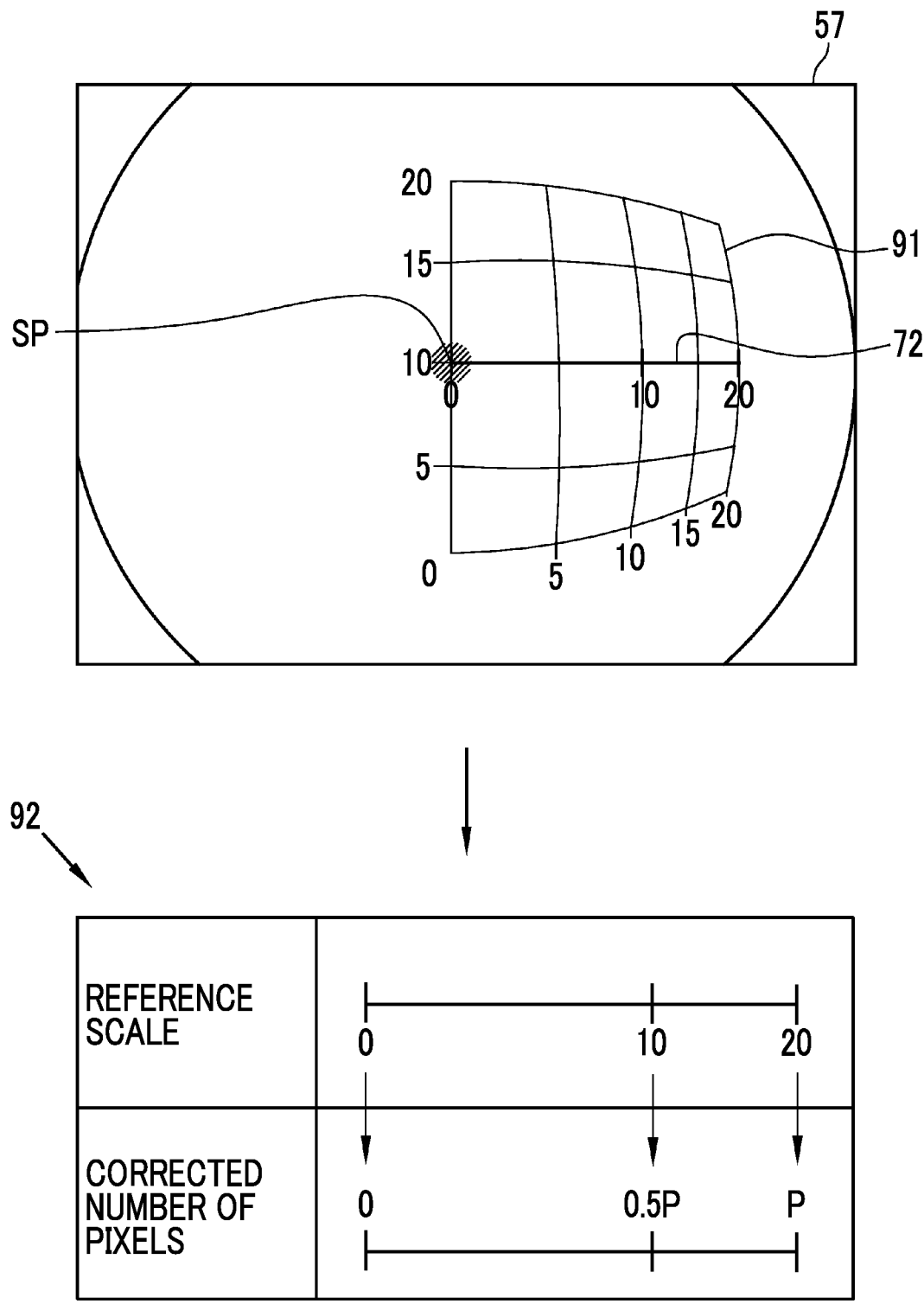
FIG. 24 is a diagram illustrating the number of corrected pixels.

The measured value marker generating section may correct the generation of a measured value marker in consideration of the distortion of a picked-up image acquired by the endoscope. As shown in FIG. 24, for example, a corrected scale table in which the actual size of the picked-up image 57 and the number of pixels considering distortion information are associated with each other is acquired in advance and is stored in the scale table 65. The measured value calculating section 77 generates a measured value marker using the corrected scale table.

In a case where the corrected scale table is used and the actual size of the reference scale is denoted by Lr0, the corrected number of pixels of the reference scale corrected using the distortion information of the picked-up image is denoted by Ar, the corrected number of pixels of the measurement portion corrected using the distortion information of the picked-up image is denoted by Br, and the actual size of the measured value marker is denoted by Lr1, the measured value calculating section 77 generates the measured value marker so that the following equation (4) is satisfied.

$$Lr1 = Lr0 \times Br/Ar \qquad (4)$$

Figure 25:
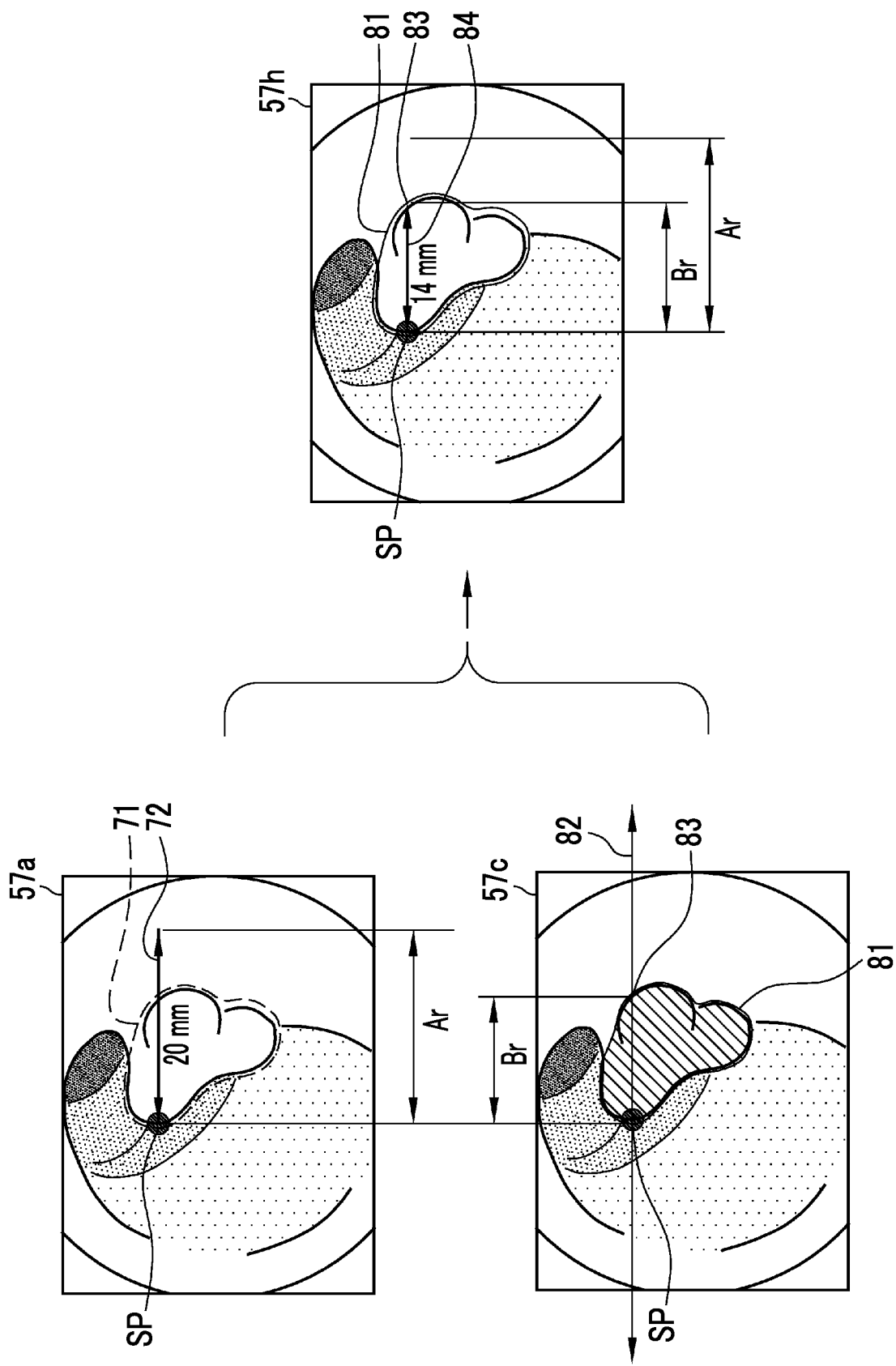
FIG. 25 is a diagram illustrating the creation of a specific image including a measured value marker that uses the number of corrected pixels.
Figure 26:
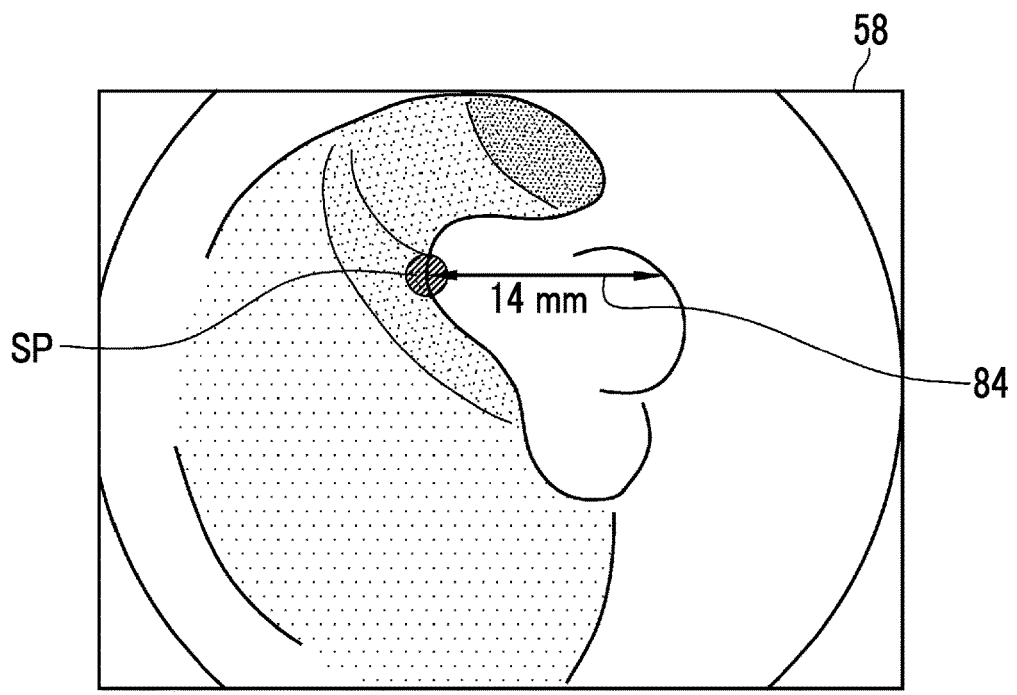
FIG. 26 is an image diagram of a specific image including a measured value marker that uses the number of corrected pixels.

As shown in FIG. 24, for example, a corrected scale table 92 can be obtained from the image pickup of a chart in which patterns having an actual size are regularly formed. Spot-like auxiliary measurement light is emitted to the chart; the image of a graph paper-shaped chart 91 including lines (5 mm) having the same size as the actual size or lines (for example, 1 mm) having a size smaller than the actual size is picked up while an observation distance is changed to change the position of a spot; and a relationship between the position of the spot (the pixel coordinates of the spot on the imaging surface of the image pickup element 46) and the corrected number of pixels corresponding to the actual size (the number of pixels representing an actual size of 5 mm) is acquired as the corrected scale table 92. For example, the maximum value 20 of the reference scale 72 is made to correspond to the maximum value P of the corrected number of pixels, and the intermediate point 10 of the reference scale 72 is made to correspond to the intermediate point 0.5P of the corrected number of pixels. Then, a more accurate calculation can be made using the reference scale 72, the corrected number Ar of pixels, and the corrected number Br of pixels as shown in FIG. 25. In a case where the actual size of the measurement portion is calculated using the corrected number of pixels, for example, "14 mm" is displayed. As shown in FIG. 26, the measured value marker 84 obtained after calculation is displayed using a line segment, a numerical value, and a unit and a specific image 58 is obtained. In addition, the measured value marker 84 may be set as in the above-mentioned types.

The distortion of the picked-up image may vary depending on an endoscope. Accordingly, in order to make a more accurate measurement, it is preferable that a corrected scale table acquired and stored for each endoscope is used depending on a case.

The auxiliary measurement light may have a planar shape, the shape of a mesh, or the shape of a dot in order to grasp the three-dimensional shape of the subject. In this case, the specific region has a linear shape, the shape of a mesh, or the shape of a dot.

Figure 27:
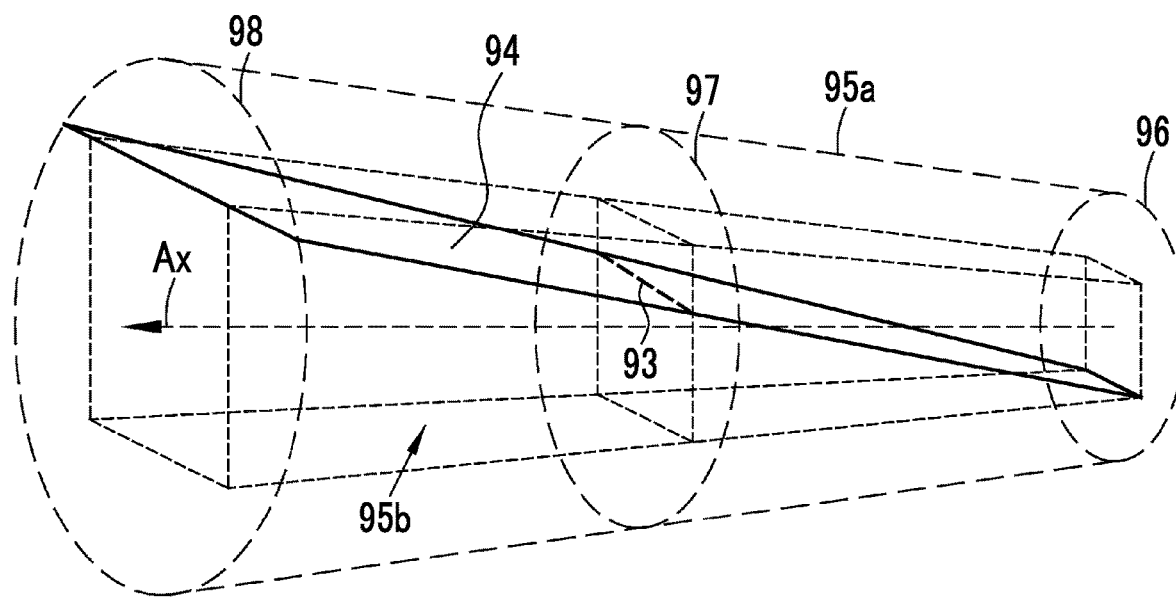
FIG. 27 is a diagram illustrating the position of a line in a case where auxiliary measurement light has a planar shape.

For example, in a case where the auxiliary measurement light has a planar shape, planar auxiliary measurement light is emitted, so that a plane 94 is formed by the auxiliary measurement light as shown in FIG. 27. The auxiliary measurement light is emitted so that the plane 94 is included in a visual field 95a of the endoscope. An effective image pickup range 95b is formed by the planar auxiliary measurement light. A line 93, which is a linear specific region, is formed in the shape of the subject in a state where the position of the line 93 in the picked-up image varies depending on a distance between the emission position of the auxiliary measurement light and the subject. Since the auxiliary measurement light is emitted from the right in FIG. 27, the line 93 having the shape of the subject is formed as shown in a cross section 96, 97, or 98 as a distance between the emission position of the auxiliary measurement light and the subject is increased. Accordingly, the line 93 is moved up from the lower side on the subject. Even though the linear auxiliary measurement light is used as described above, the size of the subject can be measured in the same manner as described above.

Figure 28:
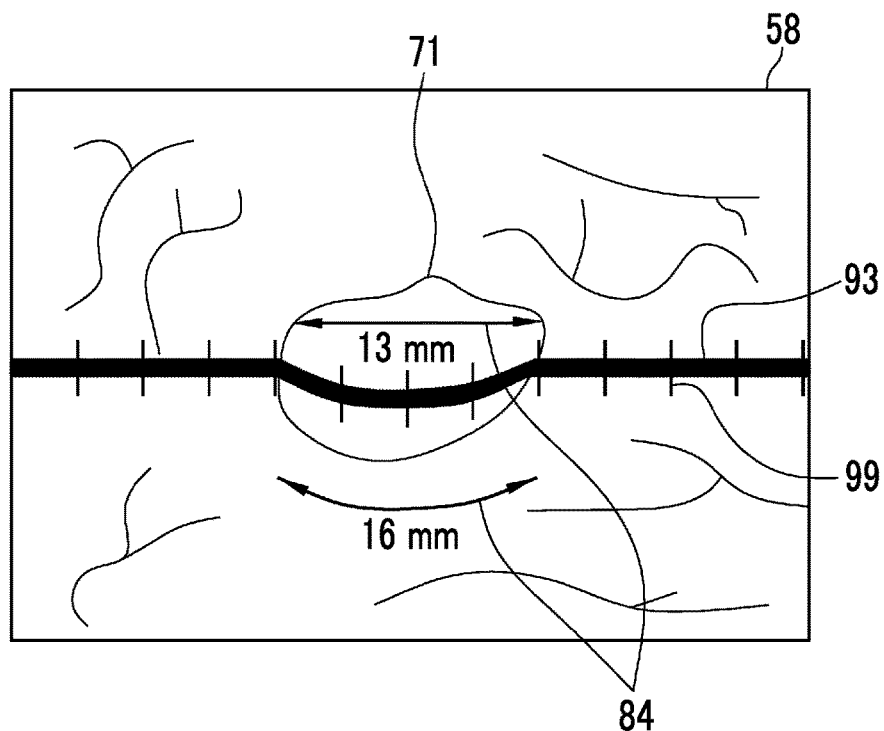
FIG. 28 is a diagram illustrating a line, which is formed on a subject by auxiliary measurement light, and measured value markers.

In a case where the linear auxiliary measurement light is used and, for example, a polyp 71 has a three-dimensional shape and the central portion of the polyp 71 bulges toward the distal end part of the endoscope in a specific image 58 as shown in FIG. 28, the line 93 has a curved shape due to the three-dimensional shape of the polyp 71. Correspondence information between gradations indicating an actual size and the number of pixels is acquired in advance, and gradations 99 are superimposed on the picked-up image by the display controller 53 using the corrected scale table stored in the scale table. Accordingly, not only, for example, the size of the polyp 71 in the horizontal direction but also information about the depth (height) of the polyp 71 can be obtained using the auxiliary measurement light on the line having this curved shape, so that the height of the polyp 71 can be estimated. The same method as that for creating the measured value marker as described above can be used as a method of estimating and measuring the height of the polyp 71. In this way, for example, a measured value marker 84 in which the size of the polyp 71 in the horizontal direction is set to "13 mm" and a measured value marker 84 in which the size of the polyp obtained from the length of the line 93 considering information about the depth of the polyp 71 is set to "16 mm" are generated and are superimposed on a picked-up image, so that a specific image 58 is generated. A measured value marker 84 in which the numerical value of the depth of the polyp is set as a height may be used.

Mesh-like auxiliary measurement light, dot-like auxiliary measurement light, or concentric auxiliary measurement light may be used in addition to the planar auxiliary measurement light. As in the case of the planar auxiliary measurement light, not only the size of a subject in a case where a subject is a flat surface but also depth information in a case where a subject has a depth are obtained with these types of auxiliary measurement light using a difference between the shape of a specific region of a subject having no depth and the shape of a specific region of a subject having a depth. Accordingly, not only the size of the subject in a two-dimensional direction but also the size of a depth can be measured.

It is preferable that the region-of-interest extracting section extracts a region of interest using a trained model trained using picked-up images acquired in the past. Various models suitable for image recognition using machine learning can be used as a model used as the trained model. A model using a neural network can be preferably used for the purpose of recognizing a region of interest in an image. In a case where these models are to be trained, these models are trained using picked-up images, which include information about the region of interest, as teacher data. Examples of the information about the region of interest include the presence or absence of the region of interest, the position or range of the region of interest, and the like. Some models may be trained using picked-up images not including the information about the region of interest.

Further, it is preferable that the measurement portion determining section also determines a measurement portion using a trained model trained using picked-up images acquired in the past. Models and the like used as the trained model are the same as those of the region-of-interest extracting section. However, in a case where these models are to be trained, these models are trained using picked-up images that include information about the measurement portion. The information about the measurement portion includes a measured value and the measurement portion. Some models may be trained using picked-up images not including the information about the measurement portion. The trained model used by the region-of-interest extracting section and the trained model used by the measurement portion determining section may be common. In a case where a purpose is to extract the measurement portion, one trained model may be used to extract the measurement portion without extracting the region of interest from the picked-up image 57.

The trained models used by the region-of-interest extracting section 74 and the measurement portion determining section 75 may extract a plurality of regions of interest and measurement portions as candidates in addition to extracting one region of interest and one measurement portion. In this case, for example, in the case of a region of interest, after a plurality of regions of interest are superimposed and displayed in the picked-up image 57, one region of interest is extracted from the plurality of regions of interest according to an instruction received by the measurement content receiving section 76. As a method of instruction, the trained model extracts a plurality of regions of interest and superimposes and displays the regions of interest in the picked-up image 57 in the form of contour lines. Then, a user forms a spot SP on a contour line indicating a region of interest that the user wants to measure among the plurality of regions of interest. After that, the signal processing unit 52 recognizes the spot SP to extract one region of interest from the plurality of candidates of a region of interest. The subsequent flow is the same as described above.

Figure 29:
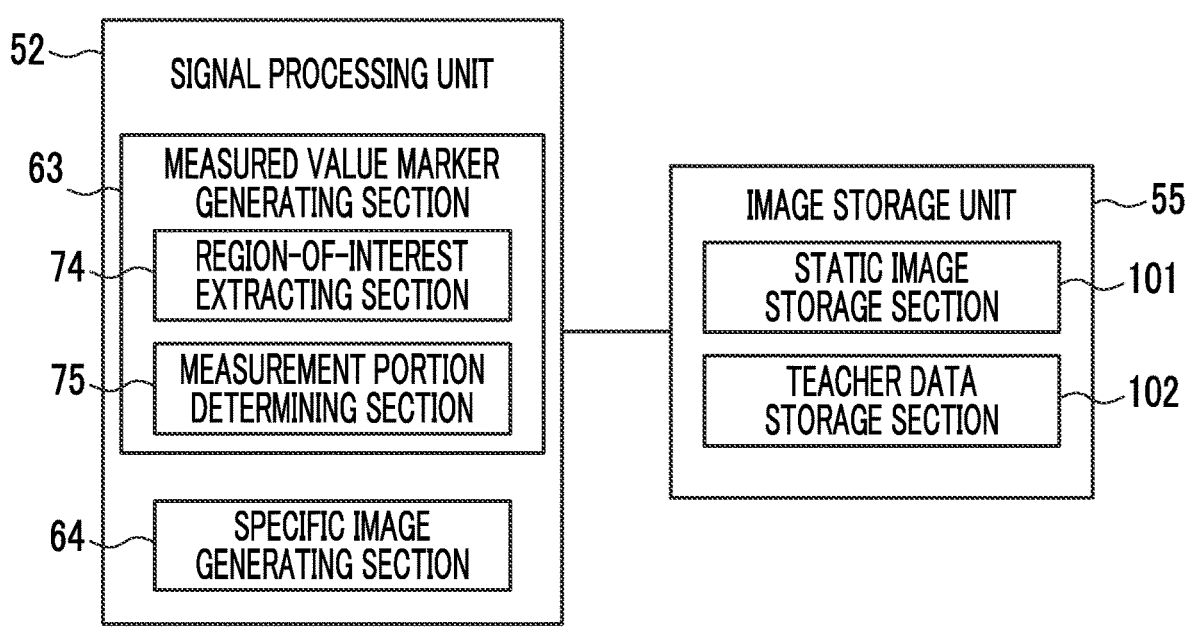
FIG. 29 is a block diagram showing the functions of an image storage unit.

It is preferable that a teacher data storage section storing teacher data in which the specific image and the measured value are associated with each other is provided. As shown in FIG. 29, the image storage unit 55 comprises a static image storage section 101 and a teacher data storage section 102. The specific image generating section 64 sends a generated specific image to the display controller 53 to display the generated specific image on the monitor 15 and sends the generated specific image to the teacher data storage section 102 as teacher data, and the teacher data storage section 102 stores the specific image as teacher data. Since the specific image is image information that includes information about a measurement portion, such as a measured portion and a measured value, the specific image is useful as, for example, teacher data for a learning model of machine learning regarding the measured value of a picked-up image.

Figure 30:
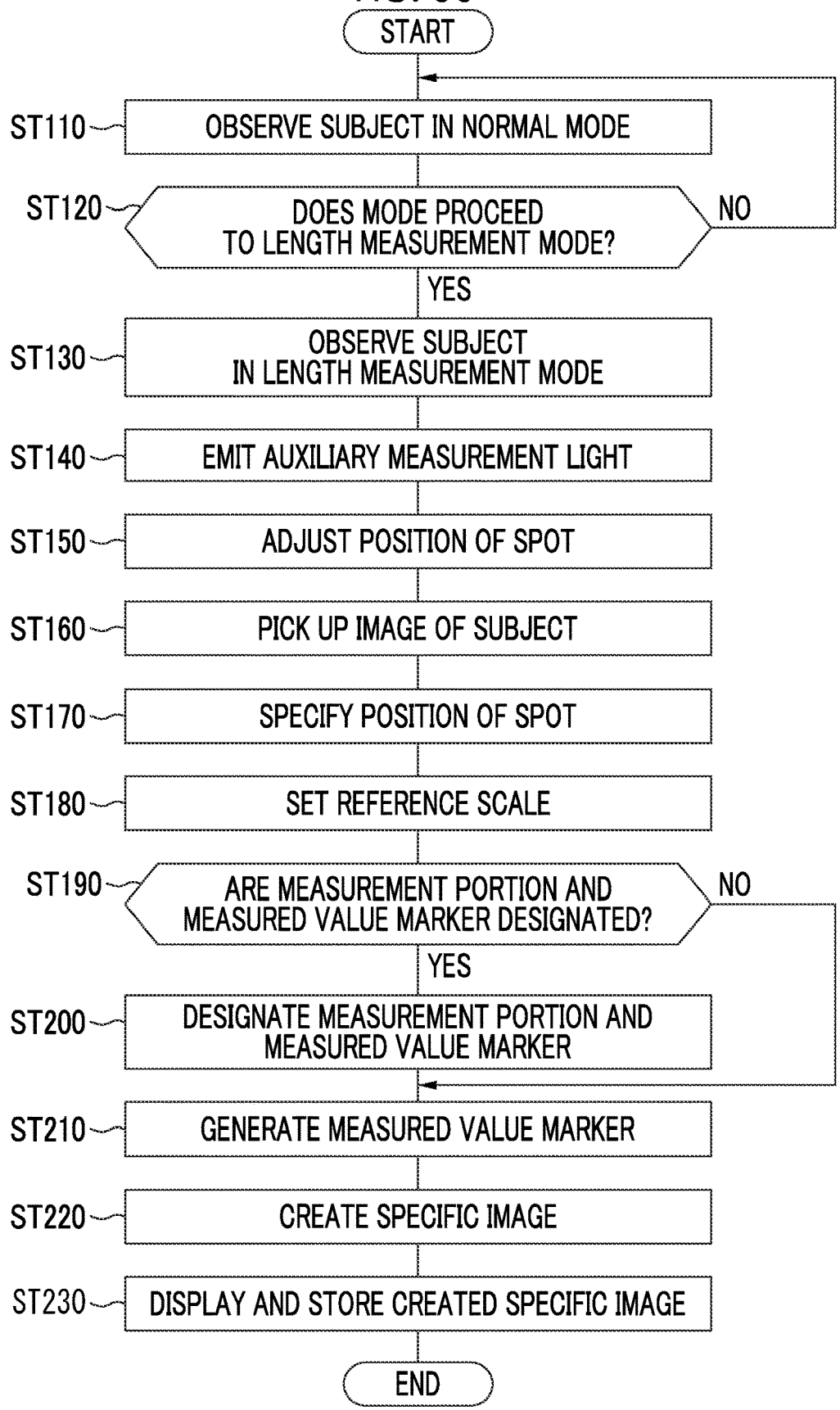
FIG. 30 is a flowchart illustrating the flow of the creation and storage of a specific image that are performed by the endoscope apparatus.

Next, the action of the above-mentioned configuration will be described with reference to a flowchart of FIG. 30. First, a subject is observed in the normal mode (Step ST110). For example, in a case where an object to be observed, which needs to be measured, is found in the subject, a mode proceeds to the length measurement mode with the scope button 12a or the like (YES in Step ST120). In a case where a mode does not proceed to the length measurement mode (NO in Step ST120), the subject continues to be observed in the normal mode.

In a case where a mode proceeds to the length measurement mode, the subject is observed in the length measurement mode (Step ST130). The auxiliary measurement light-emitting unit 45 emits auxiliary measurement light (Step ST140). The subject is observed in a state where a spot ST formed by the auxiliary measurement light is positioned at an end portion that is a portion of a measurement portion where a user wants to use as, for example, a base point for measurement (step ST150). A picked-up image obtained from the image pickup of the subject is acquired by the image pickup element (Step ST160). The position specifying section 61 specifies the position of the spot ST on the basis of the picked-up image (Step ST170).

The reference scale setting section 62 sets a reference scale using the obtained picked-up image and the scale table 65 (Step ST180). In a case where the measurement portion is designated and the type of a measured value marker is designated (YES in Step ST190), the measurement portion in the horizontal direction or the like is designated, the type of a measured value marker is designated in a case where the type of a measured value marker that the user wants to display is designated, and the measurement content receiving section 76 receives the designation of the measurement portion and the designation of the type of a measured value marker (step ST200). In a case where the measurement portion and the like are not designated (NO in Step ST190), a measurement portion and a measured value marker used in the immediately preceding observation are automatically applied. After that, a measured value marker is generated (Step ST210) and is superimposed on a picked-up image 57, so that a specific image 58 is created (Step ST220). The created specific image 58 is displayed on the monitor 15 and is stored in the teacher data storage section 102 of the image storage unit 55 (Step ST230).

In the above-mentioned flow of observation, in a case where the measurement portion and the type of a measured value marker are not particularly designated, the user can obtain the measured value of a specific measured portion of a region of interest in the form of a numerical value by merely positioning the spot SP at a portion that the user wants to use as a base point for measurement. Accordingly, required work is reduced as compared to the related art where a user visually compares a measured value marker with an object to be measured to obtain the measured value of a portion that the user wants to measure as shown in FIG. 31. In a case where the size of a polyp 71 from a spot SP in the horizontal direction is to be measured in the related art, for example, the value of a length ratio of B/A is estimated and multiplied by 20 mm, which is the numerical value of a marker, to measure the size of the polyp. Here, A denotes the length of a reference scale and B denotes the size (length) of the polyp in the horizontal direction.

Further, since time required to obtain a measured value is significantly reduced, the influence of the movement or the like of the subject is also reduced. As a result, the accuracy and speed of a measured value are improved. Furthermore, since a trained model can be used for the extraction of a region and/or the extraction of a measurement portion, accuracy is improved in the extraction of the region of interest or the calculation of the measured value. Moreover, since the display of a measured value marker can be changed by setting, it is possible to prevent observation from being hindered by the endoscope. Further, since a numerical value itself can be used as the form of a measured value marker in addition to a figure, such as a line segment, this numerical data is also stored as information about a picked-up image and can be used for various purposes as patient data or teacher data. Furthermore, it is possible to obtain information of a region of interest, such as a polyp, in a depth direction by devising the shape of the auxiliary measurement light, such as a line laser. Moreover, according to the endoscope apparatus 10, information about the stenosis of the lumen, blood vessels, or the like can be obtained. Accordingly, the endoscope apparatus 10 is suitable for, for example, a case where the diameter of a stent is to be determined, a case where a balloon is applied, or the like. Even in this case, since it is possible to obtain information in a depth direction by devising the shape of the auxiliary measurement light, such as a line laser, the endoscope apparatus 10 is preferable. Further, the above-mentioned flow can be automatically performed. According to the endoscope apparatus 10, it is possible to simply measure an object to be measured as described above.

In the embodiments, the hardware structure of a processing unit, which performs various types of processing, such as the signal processing unit 52, the display controller 53, the system controller 54, or the image storage unit 55, is various processors to be described below. Various processors include: a central processing unit (CPU) that is a general-purpose processor functioning as various processing units by executing software (program); a programmable logic device (PLD) that is a processor of which the circuit configuration can be changed after manufacture, such as a field programmable gate array (FPGA); a dedicated electrical circuit that is a processor having circuit configuration designed exclusively to perform specific processing, such as an application specific integrated circuit (ASIC); and the like.

One processing unit may be formed of one of these various processors, or may be formed of a combination of two or more same kind or different kinds of processors (for example, a plurality of FPGAs, or a combination of a CPU and an FPGA). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor implementing the functions of the entire system, which includes a plurality of processing units, by one integrated circuit (IC) chip as typified by System On Chip (SoC) or the like is used. In this way, various processing units are formed using one or more of the above-mentioned various processors as hardware structures.

In addition, the hardware structures of these various processors are more specifically electrical circuitry where circuit elements, such as semiconductor elements, are combined.

Another aspect of the present invention is an endoscope apparatus comprising an auxiliary measurement light source unit that emits auxiliary measurement light to be used for measurement of a subject and a processor. The processor acquires a picked-up image obtained from image pickup of the subject that includes a specific region formed on the subject by the auxiliary measurement light; specifies a position of the specific region formed on the subject in the picked-up image; sets a reference scale, which indicates an actual size of the subject, on the basis of the position of the specific region; extracts a region of interest that is included in the subject in the picked-up image; determines a measurement portion, of which a size is to be measured, of the region of interest; generates a measured value marker, which indicates a measured value obtained from measurement of the measurement portion of the region of interest, on the basis of the reference scale; and creates a specific image in which the measured value marker is superimposed on the picked-up image.

It goes without saying that the present invention is not limited to the embodiment and can employ various configurations without departing from the scope of the present invention. In addition, the present invention covers not only a program but also a storage medium storing a program.

EXPLANATION OF REFERENCES

10: endoscope apparatus
12: endoscope
12a: scope button
12d: distal end part
13: light source device
13a: light source button
14: processor device
14a: processor button
15: monitor
16: keyboard
17: foot switch
17a: left switch
17b: right switch
21: insertion part
22: operation part
23: universal cable
25: connector
31: objective lens
32: illumination lens
33: auxiliary measurement light lens
34: opening
35: air/water supply nozzle
41: light source unit
42: light source controller
43: light guide
44a: illumination optical system
44b: image pickup optical system
45: auxiliary measurement light-emitting unit
45a: light source
45b: auxiliary measurement light-generating element
45c: prism
46: image pickup element
47: image pickup controller
48: CDS/AGC circuit
49: A/D converter
50, 51: communication I/F
52: signal processing unit
53: display controller
54: system controller
55: image storage unit
57, 57a to 57h: picked-up image
58: specific image
60: normal signal processing section
61: position specifying section
62: reference scale setting section
63: measured value marker generating section
64: specific image generating section
65: scale table
71: polyp
72: reference scale
74: region-of-interest extracting section
75: measurement portion determining section
76: measurement content receiving section
77: measured value calculating section
81: region of interest
82: horizontal direction
83: horizontal edge position
84: measured value marker
86: extension direction
87: extension edge position
88: maximum direction
89: maximum edge position
91: chart
92: corrected scale table
93: line
94: plane
95a: visual field
95b: effective image pickup range
96, 97, 98: cross section
99: gradation
101: static image storage section
102: teacher data storage section
A: length of reference scale
Aa: number of pixels of reference scale
B: size of polyp in horizontal direction
Ba, Bb, Bc: number of pixels of measurement portion
Ar, Br: corrected number of pixels
Li1: solid line
Li2: dotted line
D1: first direction
D2: second direction
Dv: observation distance
Lm: optical axis of auxiliary measurement light
Ax: optical axis of image pickup optical system
Px: near end
Py: intermediate vicinity
Pz: far end
P1: position
Qx, Qy, Qz: image pickup range
Rx: range of observation distance
SP: spot
ST110 to ST230: Step

What is claimed is:
1. An endoscope apparatus comprising:
an auxiliary measurement light source unit that emits auxiliary measurement light to be used for measurement of a subject; and
a processor configured to:
acquire a picked-up image obtained from image pickup of the subject that includes a specific region formed on the subject by the auxiliary measurement light;
specify a position of the specific region formed on the subject in the picked-up image;
set a reference scale, which indicates an actual size of the subject, on the basis of the position of the specific region;
extract a region of interest that is included in the subject in the picked-up image;
determine a measurement portion, of which a size is to be measured, of the region of interest;
generate a measured value marker, which indicates a measured value obtained from measurement of the measurement portion of the region of interest, on the basis of the reference scale; and
create a specific image in which the measured value marker is superimposed on the picked-up image,
wherein the measured value marker is generated based on a superimposing portion between the reference scale and the measurement portion of the region of interest, or a superimposing portion between the reference scale and the measurement portion of the region of interest in a case where a correction is made in consideration of distortion information of the picked-up image, and
wherein the measured value marker is generated by changing an actual size of the reference scale according to the number of pixels of the superimposing portion.

2. The endoscope apparatus according to claim 1,
wherein the processor is configured to determine a size of the region of interest in a horizontal direction, which is obtained in a case where the picked-up image is displayed on a display, as the measurement portion.

3. The endoscope apparatus according to claim 1,
wherein the processor is configured to determine a portion as the measurement portion, wherein in a case where the specific region is present on the region of interest and the specific region is used as a base point, the portion is a maximum distance between an edge of the region of interest and the base point.

4. The endoscope apparatus according to claim 1,
wherein the processor is configured to determine a portion, which has a maximum size in an arbitrary direction, of the region of interest as the measurement portion.

5. The endoscope apparatus according to claim 1,
wherein the processor is configured to receive a designation of the measurement portion, and
determine the measurement portion according to the designation.

6. The endoscope apparatus according to claim 1,
wherein the processor is configured to generate the measured value marker so that the following equation (1) is satisfied, where the actual size of the reference scale is denoted by L0, the number of pixels of the reference scale in a case where the reference scale is superimposed on the picked-up image is denoted by Aa, the number of pixels of the measurement portion in a case where the reference scale is superimposed on the measurement portion of the region of interest in the picked-up image is denoted by Ba, and an actual size of the measured value marker is denoted by L1, $$L1=L0 \times Ba/Aa \quad (1).$$

7. The endoscope apparatus according to claim 1,
wherein the processor is configured to generate the measured value marker so that the following equation (2) is satisfied, where the actual size of the reference scale is denoted by L0, the number of pixels of the reference scale in a case where the reference scale is superimposed on the picked-up image and the correction is made in consideration of the distortion information of the picked-up image is denoted by Ac, the number of pixels of the measurement portion in a case where the reference scale is superimposed on the measurement portion of the region of interest in the picked-up image and the correction is made in consideration of the distortion information of the picked-up image is denoted by Bc, and an actual size of the measured value marker is denoted by L1, $$L1=L0 \times Bc/Ac \quad (2).$$

8. The endoscope apparatus according to claim 1,
wherein the auxiliary measurement light has a planar shape, a shape of a mesh, or a shape of a dot, and
the specific region has a linear shape, a shape of a mesh, or a shape of a dot.

9. The endoscope apparatus according to claim 1,
wherein the measured value marker has a shape of a straight line segment or a shape of a combination of straight line segments.

10. The endoscope apparatus according to claim 1,
wherein the measured value marker includes a numeral that represents the measured value.

11. The endoscope apparatus according to claim 1,
wherein the measured value marker is a numeral itself that represents the measured value.

12. The endoscope apparatus according to claim 1,
wherein the processor is configured to create a specific image in which the measured value marker is superimposed on the picked-up image so as to be aligned with the measurement portion of the region of interest.

13. The endoscope apparatus according to claim 1,
wherein the processor is configured to create a specific image in which the measured value marker is superimposed on the picked-up image at a portion other than the measurement portion of the region of interest.

14. The endoscope apparatus according to claim 1,
wherein the processor is configured to extract the region of interest using a trained model trained using the picked-up image acquired in the past.

15. The endoscope apparatus according to claim 1,
wherein the processor is configured to determine the measurement portion using a trained model trained using the picked-up image acquired in the past.

16. The endoscope apparatus according to claim 1,
wherein the processor is configured to store teacher data in which the specific image and the measured value are associated with each other.

17. A method of operating an endoscope apparatus, the method comprising:
an auxiliary measurement light emission step of emitting auxiliary measurement light to be used for measurement of a subject;
a picked-up image acquisition step of acquiring a picked-up image obtained from image pickup of the subject that includes a specific region formed on the subject by the auxiliary measurement light;
a position specifying step of specifying a position of the specific region formed on the subject in the picked-up image;
a reference scale setting step of setting a reference scale, which indicates an actual size of the subject, on the basis of the position of the specific region;
a region-of-interest extraction step of extracting a region of interest that is included in the subject in the picked-up image;
a measurement portion determination step of determining a measurement portion, of which a size is to be measured, of the region of interest;
a measured value marker generation step of generating a measured value marker, which indicates a measured value obtained from measurement of the measurement portion of the region of interest, on the basis of the reference scale; and
a specific image generation step of creating a specific image in which the measured value marker is superimposed on the picked-up image,
wherein the measured value marker is generated based on a superimposing portion between the reference scale and the measurement portion of the region of interest, or a superimposing portion between the reference scale and the measurement portion of the region of interest in a case where a correction is made in consideration of distortion information of the picked-up image, and
wherein the measured value marker is generated by changing an actual size of the reference scale according to the number of pixels of the superimposing portion.

18. A non-transitory computer readable medium for storing a computer-executable program for an endoscope apparatus including an auxiliary measurement light source unit that emits auxiliary measurement light to be used for measurement of a subject, the computer-executable program causing a computer to implement:

a function of emitting auxiliary measurement light to be used for measurement of a subject;

a function of acquiring a picked-up image obtained from image pickup of the subject that includes a specific region formed on the subject by the auxiliary measurement light;

a function of specifying a position of the specific region formed on the subject in the picked-up image;

a function of setting a reference scale, which indicates an actual size of the subject, on the basis of the position of the specific region;

a function of extracting a region of interest that is included in the subject in the picked-up image;

a function of determining a measurement portion, of which a size is to be measured, of the region of interest;

a function of generating a measured value marker, which indicates a measured value obtained from measurement of the measurement portion of the region of interest, on the basis of the reference scale; and a function of creating a specific image in which the measured value marker is superimposed on the picked-up image, wherein the measured value marker is generated based on a superimposing portion between the reference scale and the measurement portion of the region of interest, or a superimposing portion between the reference scale and the measurement portion of the region of interest in a case where a correction is made in consideration of distortion information of the picked-up image, and wherein the measured value marker is generated by changing an actual size of the reference scale according to the number of pixels of the superimposing portion.

* * * * *